Feb. 3, 1942.   J. JANDASEK   2,271,919
TURBINE TORQUE CONVERTER
Original Filed June 27, 1931   7 Sheets-Sheet 5
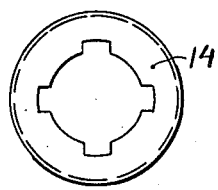
Fig. 29.
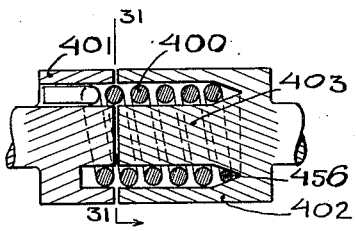
Fig. 30.
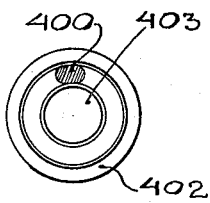
Fig. 31.
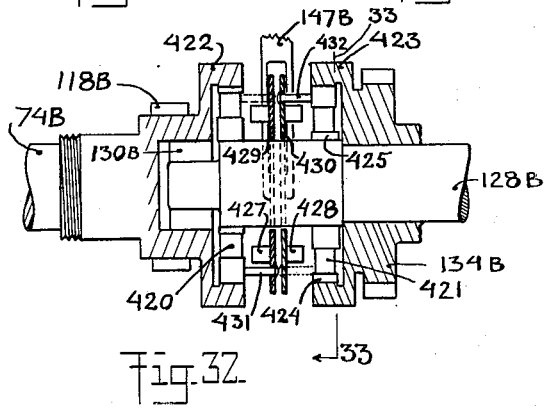
Fig. 32.
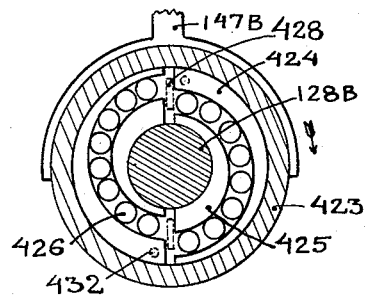
Fig. 33.
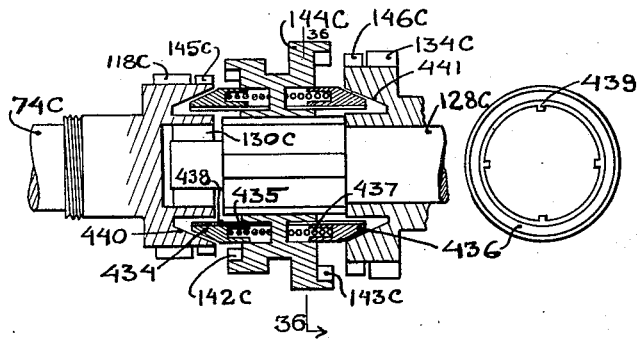
Fig. 34.   Fig. 35.   Fig. 36.
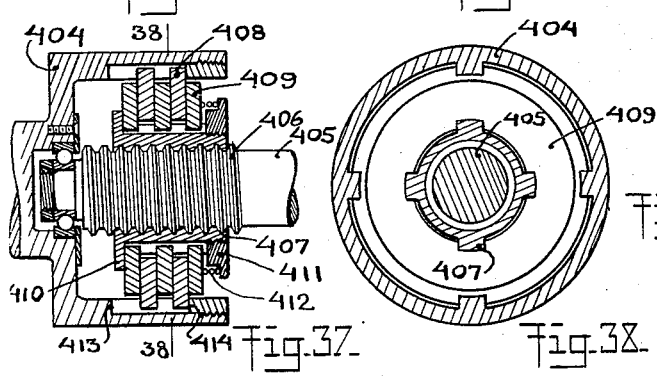
Fig. 37.   Fig. 38.
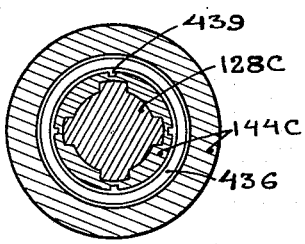
INVENTOR.
Joseph Jandasek
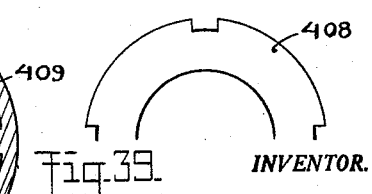
Fig. 39.

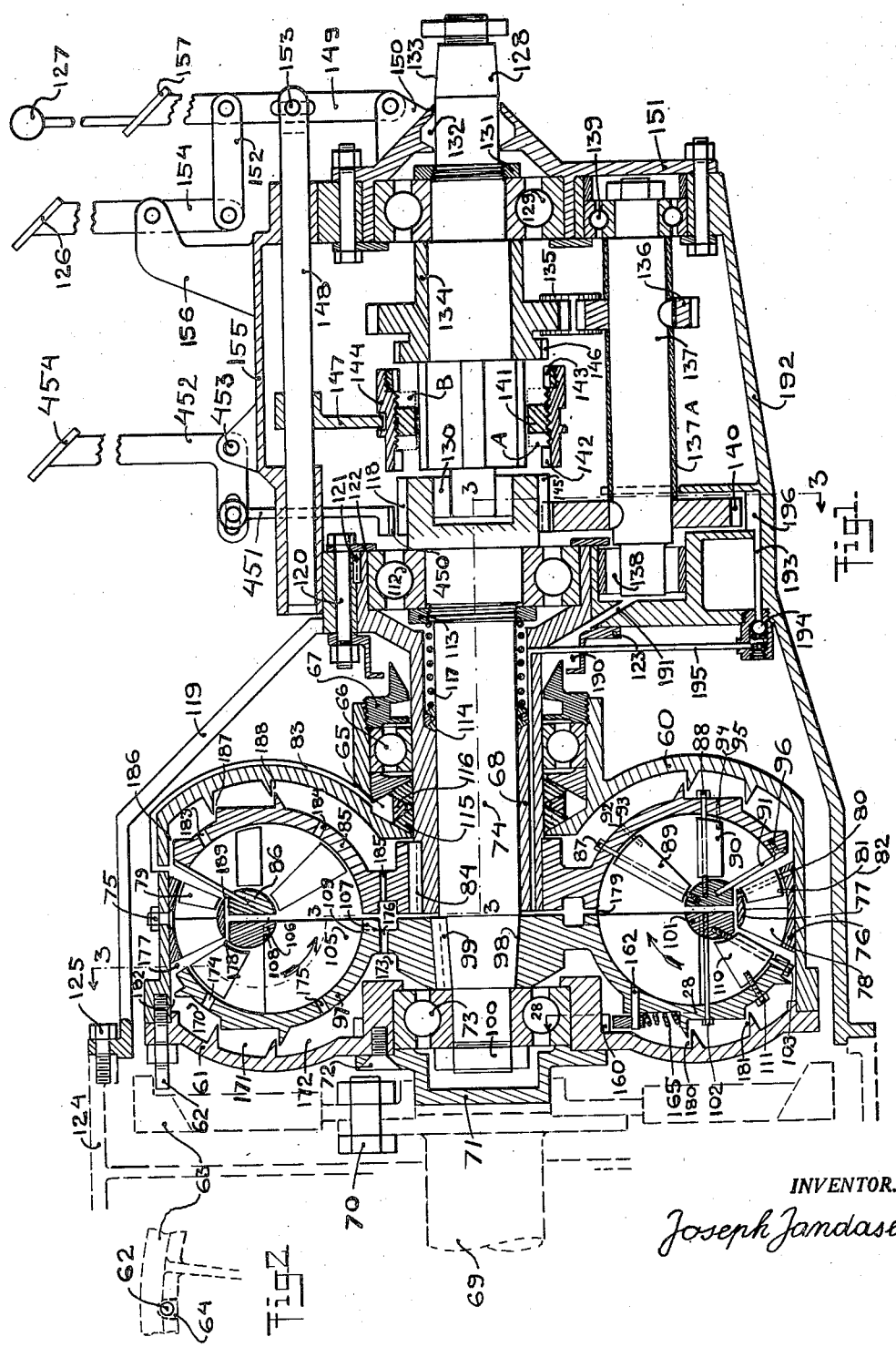

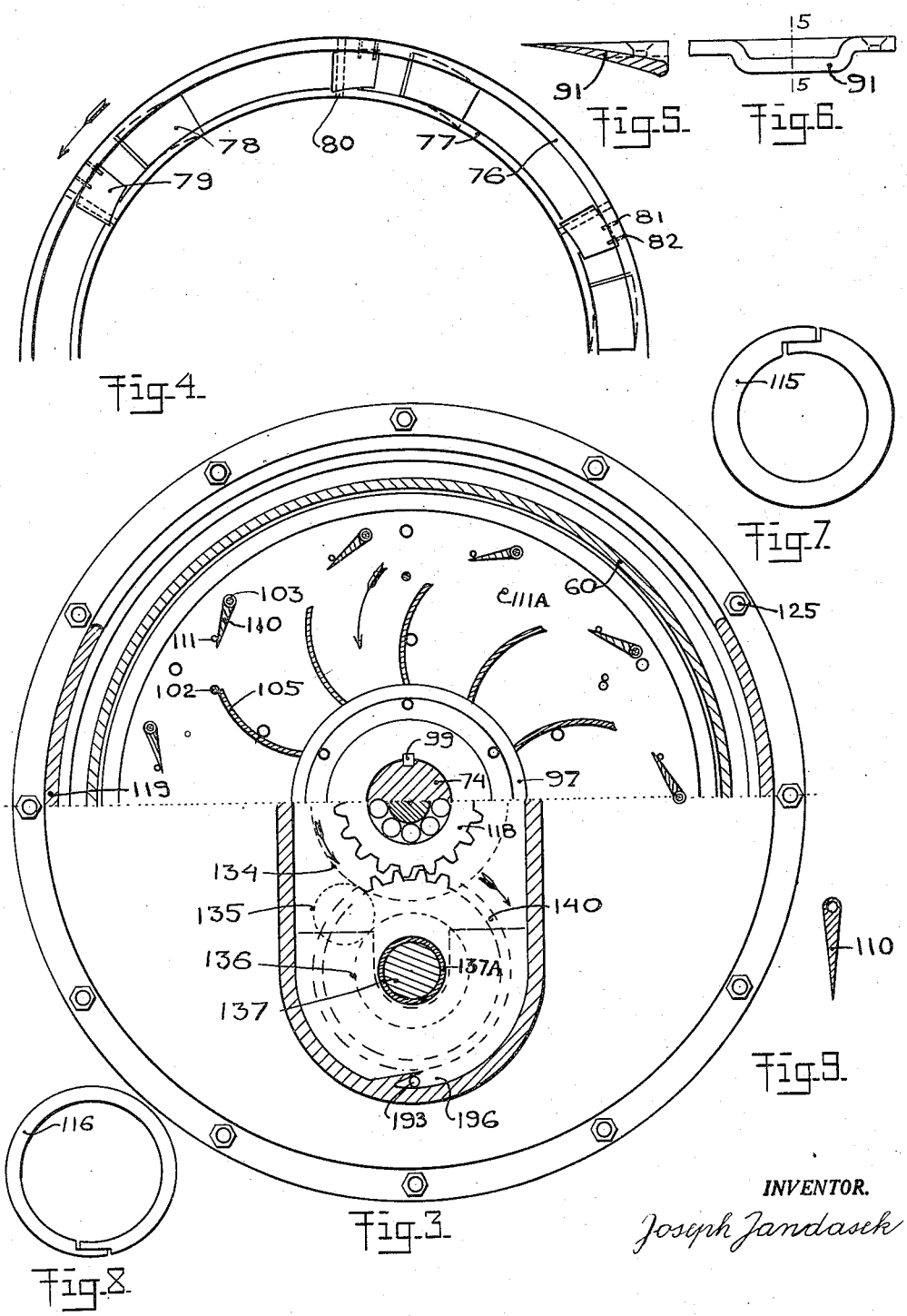

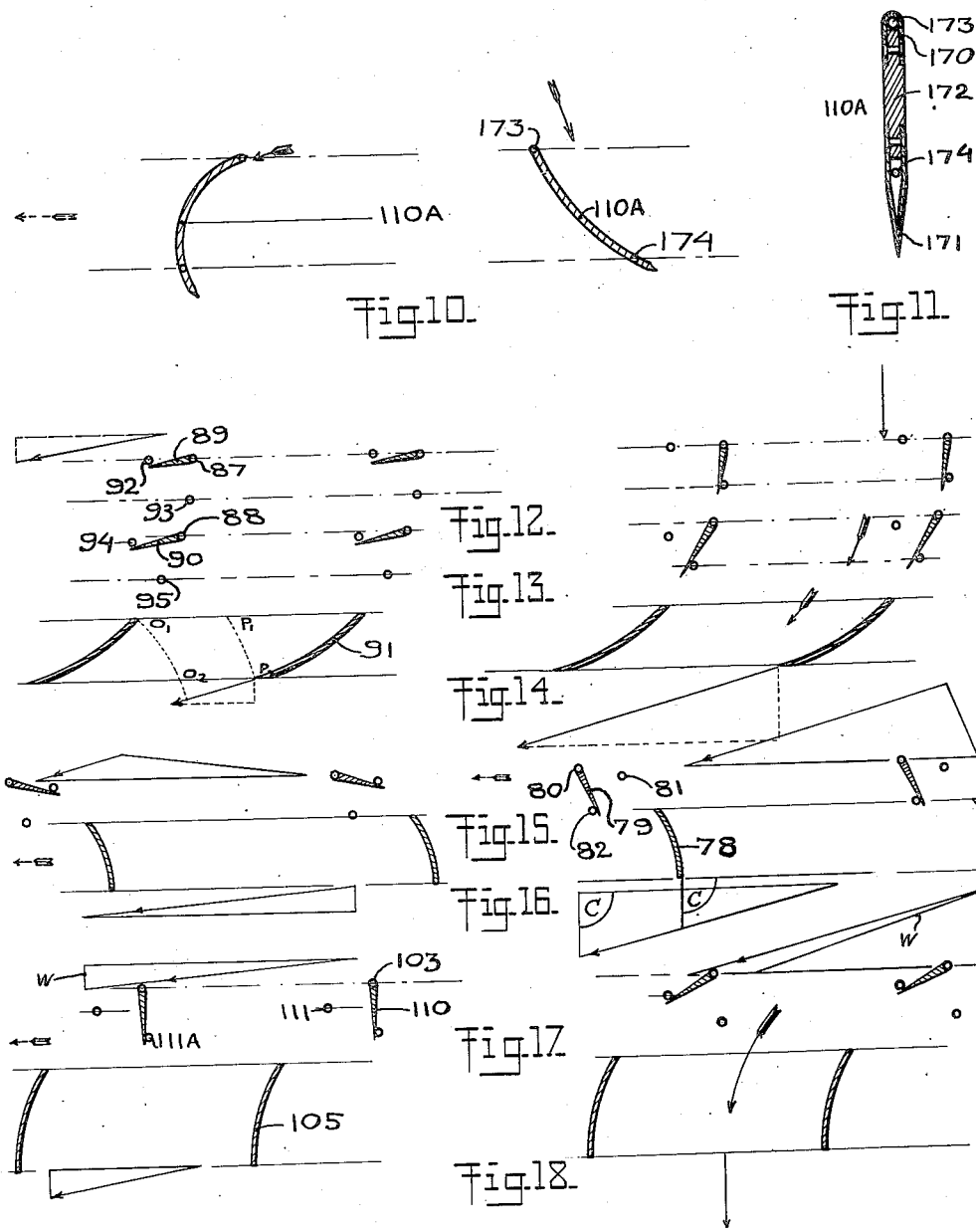

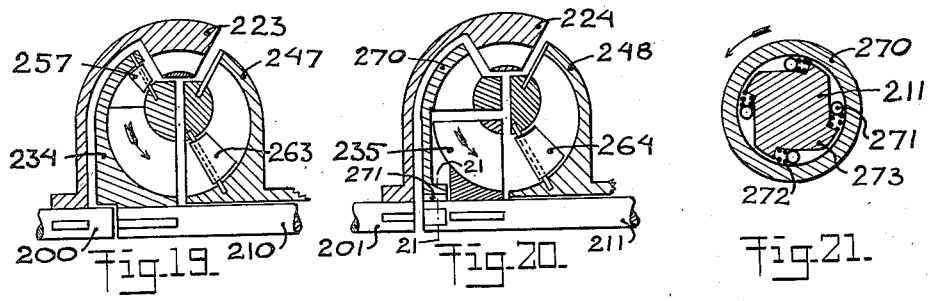
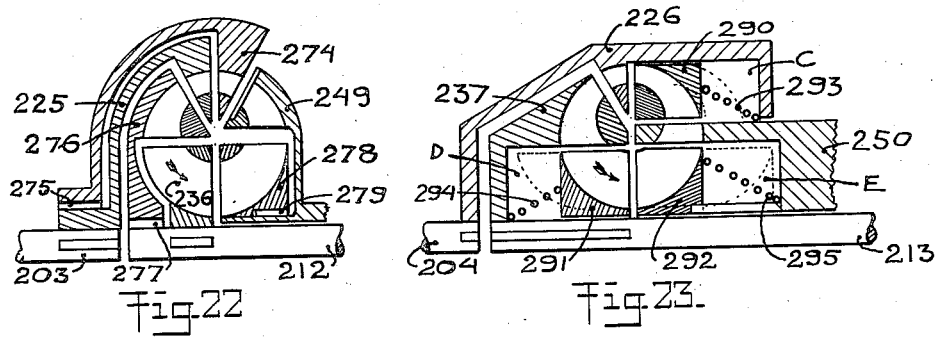
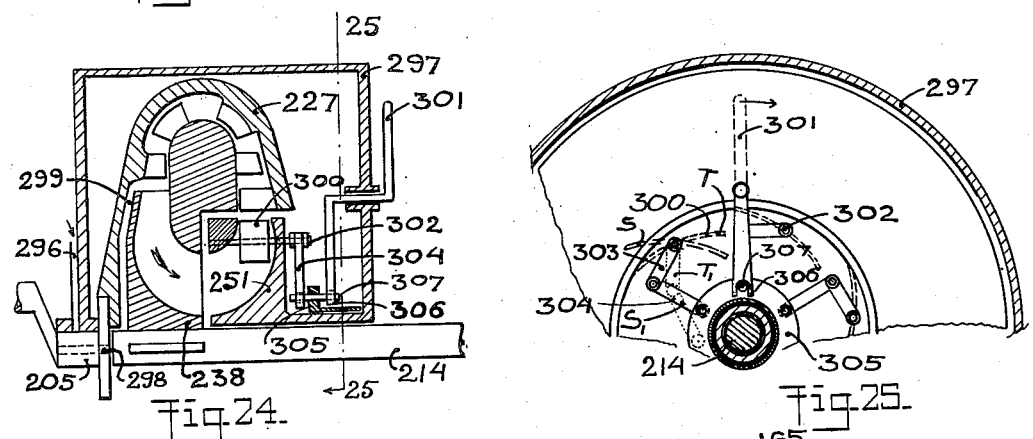
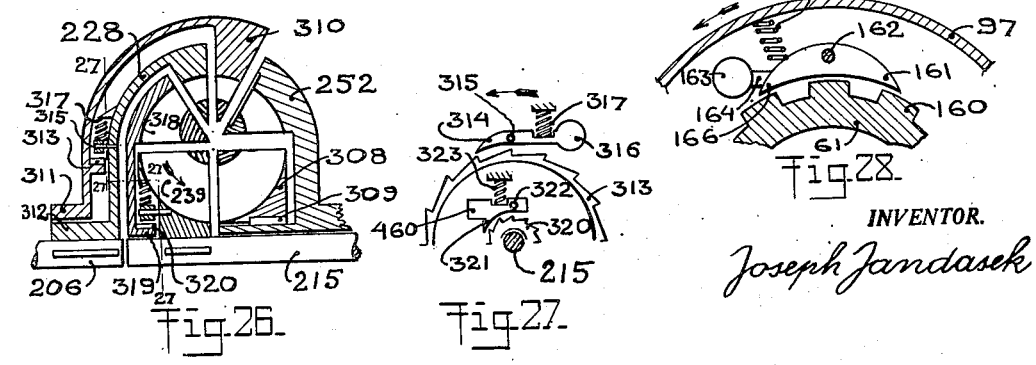

Feb. 3, 1942.    J. JANDASEK    2,271,919
TURBINE TORQUE CONVERTER
Original Filed June 27, 1931    7 Sheets-Sheet 6
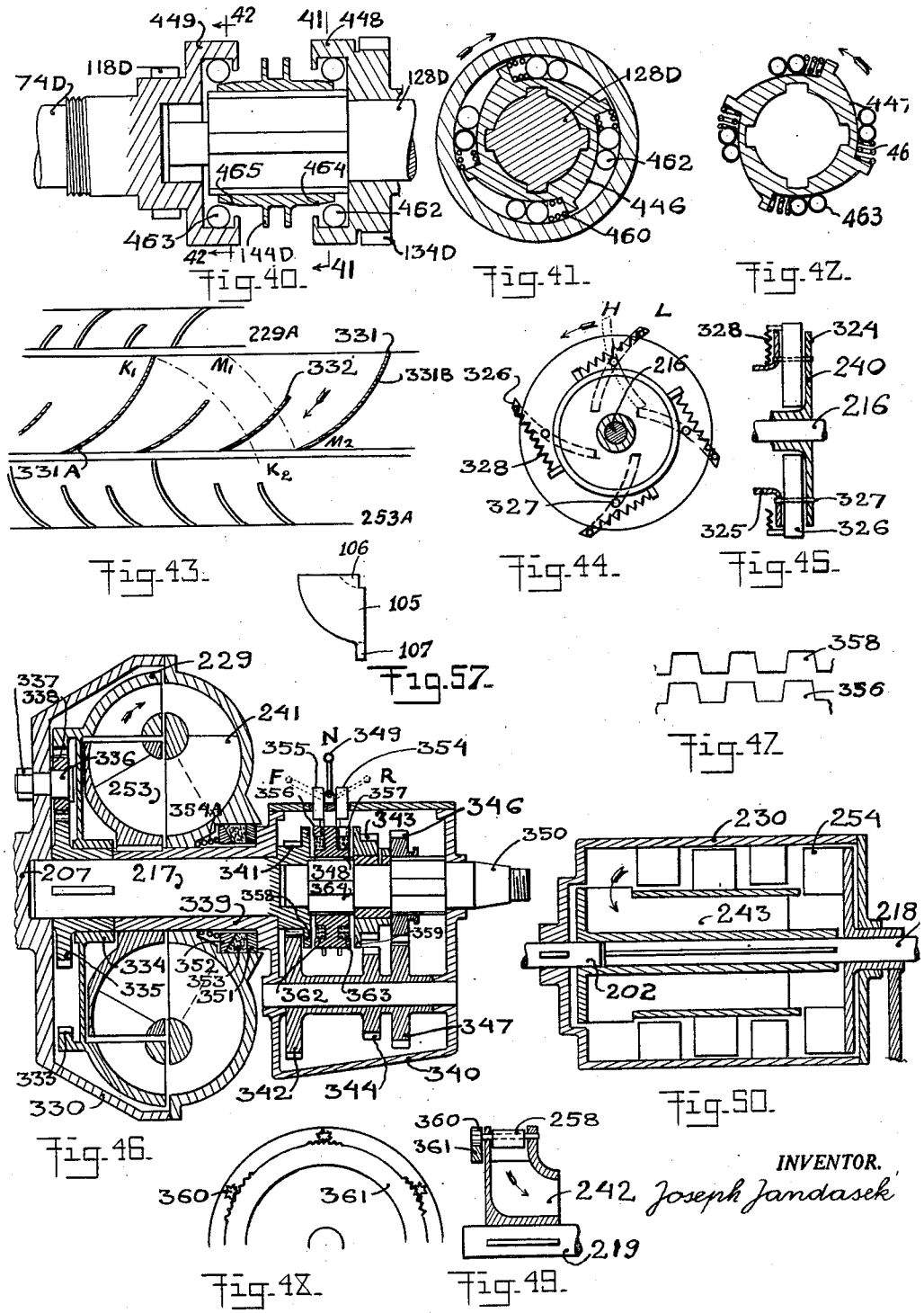
INVENTOR.
Joseph Jandasek

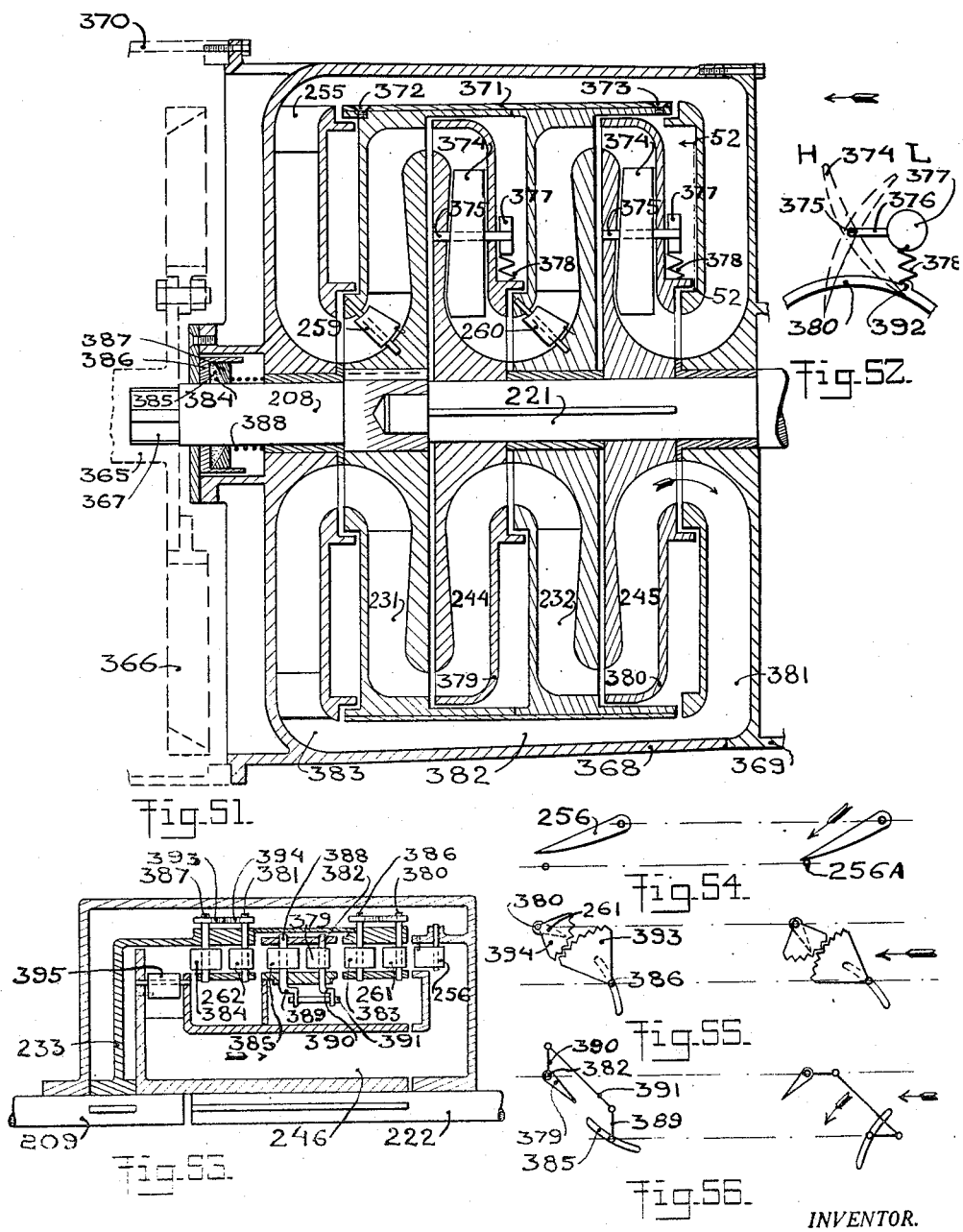

Patented Feb. 3, 1942

2,271,919

UNITED STATES PATENT OFFICE 2,271,919

TURBINE TORQUE CONVERTER

Joseph Jandasek, Cicero, Ill.

Application June 27, 1931, Serial No. 547,256
Renewed July 10, 1936

24 Claims. (Cl. 60—54)

This invention relates to means for transmitting power, and more particularly to a fluid transmission of the type having rotary driving or impeller means to impart energy to a fluid and driven or turbine runner means to absorb energy from the energized fluid. The invention is further characterized by the fact that vanes, stationary gates, or a guide wheel is interposed between the exit from the driven means and the entrance to the driving means.

I provide a high speed rotary mechanism for the transmission of power by means of a fluid driven at varying speeds in such a manner that from any applied driving speed and torque, the driven speed and torque obtained is such that the torque varies automatically in accordance with the load, and the speed varies inversely as the torque. In this manner the efficiency remains high throughout the whole range of speed because entrance angles of the driving, driven and stationary vanes are corrected to give the best results at all speeds and loads.

In hitherto known constructions devised to obtain a difference in speed between the driving and driven members, fixed blades having substantially equal exit and entrance diameters have been used on the driving means or the impeller and on the driven means or the runner wheels, as well as guide vanes. In these constructions it is possible to obtain efficient transmission of power only when the difference in speed between the impeller and the runner is some predetermined amount. However, an apparatus which is efficient when running at the difference in speed between the impeller and the runner for which the fixed blades of the impeller and the runner are designed, becomes less and less efficient the more this predetermined difference in speed is departed from.

I have overcome this difficulty by providing an auxiliary turbine for the impeller, and by providing flexible vanes for the runner in the invention described in my copending application Serial Number 304,634, filed September 8, 1928, now Patent Number 1,855,967. I have further provided auxiliary semi-free vanes for the impeller and for the guide wheel, and I have used adjustable main vanes for the guide wheel in the invention described in my copending application Serial No. 475,278, filed August 14, 1930, now Patent No. 2,186,025, granted January 9, 1940, and I have provided adjustable blades for the runner in the invention described in my copending application Serial No. 506,636, filed January 5, 1931, now Patent Number 1,993,741, dated March 12, 1935. For the same purpose, in the present invention I have used semi-free vanes for the runner, and for the axial impeller with an exceedingly small number of vanes, and I have provided the guide wheel with exit diameter greater than entrance diameter, and have equipped the gates with entrance vanes automatically adjustable under the influence of the fluid.

A further difficulty in known fluid torque converters is that the maximum of efficiency occurs where the runner speed is only a little over half of the impeller speed. The efficiency drops off when the runner speed approaches the impeller speed or the ratio of 1:1, or direct drive. For these reasons the slow speed fluid torque converter has been impractical for use on motor vehicles where maximal efficiency on high or direct drive is essential.

In order to overcome this difficulty I have provided in the present invention semi-free and stationary vanes for the runner, and have designed the runner with stationary vanes having a much smaller entrance diameter than the exit diameter of the impeller. I have further designed the runner with substantially axial discharge of the smallest possible diameter.

In all the above referred to embodiments of my inventions I have used stationary casings for the fluid while in the present invention I employ a revolving casing for the fluid.

The present fluid power torque converter consists principally of an impeller creating velocity and pressure energy as well as angular momentum in a circulating fluid. A runner or driven member absorbs velocity and pressure energy as well as angular momentum from the circulating fluid, and the stationary channels return the fluid from the runner to the impeller, and changes the pressure energy of the fluid into velocity energy thereby increasing angular momentum of the circulating fluid at heavy loads.

The fluid circulates because more energy is imparted to it by the impeller than is absorbed by the runner, and because additional pressure energy is created from the velocity energy of the fluid by the diverging vanes of the runner. This is particularly true at heavy loads. At low speeds the centrifugal force of the fluid passing through the runner is smaller than at high speeds. In this manner my power transmitter is self-governing.

The main object of my invention is to maintain the efficiency of the torque converter constantly high particularly at high speeds, while obtaining a heavy torque in the runner at low speeds. To accomplish these results I employ auxiliary semi-free vanes for the runner, the impeller, and for the gates.

Another object of this invention is to provide a turbo transmission with a guide wheel of the largest possible exit diameter arranged in such a manner that the fluid leaves the main gates at substantially an axial direction. In this manner the required angle of inclination of the gates is increased and the fluid friction for the same amount of angular momentum imparted by the gates is decreased. In this manner the guide wheel functions as a "vortex chamber."

Another object of my invention is to provide a new combination of a fluid torque converter having a reverse gear, and to provide quick and easily operated means including a momentary free wheeling clutch for controlling said reverse gear.

A further object of the invention to equip the secondary or driven shaft with a brake to stop it from rotating, so that the gears in the gear transmission may be engaged or disengaged without shock under all operating conditions.

Another object is to make the turbo transmission as a completely independent self-contained unit which may be fastened to the engine in any desired manner such for example as by a few bolts, and to support the driving and driven shaft of the transmitter by two bearings only.

A further object of the invention is to balance the axial thrust of the impeller and the runner.

A still further object is to control the reversing means by moving a lever or pedal without bringing the vehicle to a complete stop.

Yet a further object is to provide a storage chamber for fluid leakage, and means for pumping this fluid from the storage chamber back to the fluid transmitter while the fluid transmission is operating.

Another object is to provide automatically operated means for connecting the driving and the driven means to obtain a direct or a high speed drive, thereby eliminating practically all the transmission losses.

Still another object is to provide an automatic and positive one-way clutch between the driving and the driven member so that the engine may be used as a brake in either both forward or reverse speeds.

To attain these and other objects I have interposed in my turbo transmitter between the outlet from the runner and the inlet of the impeller a stationary fixed gate and semi-free vanes, each having two stops. I have reduced the friction and shock losses caused by the flow of fluid passing through the gates by designing the fixed gates to guide the fluid as little as possible, and by keeping the wetted area, i. e. the actual surface (not projected area) of all fixed gates as small as possible, in other words non-cell-shaped form of gates.

With these and other objects in view, my invention consists in the combination, arrangement and construction hereinafter described, claimed, and illustrated in the accompanying drawings, it being understood that many changes may be made in the size, proportion of parts and details of construction within the scope of the appended claims, without departing from the spirit of the invention.

Some of the many possible embodiments of the invention are illustrated in the accompanying drawings, in which:

Figure 1 is a longitudinal section of a turbo torque converter having a reverse gear constructed in accordance with my invention, comprising an axial impeller, an inward radial flow runner, and a guide wheel with a discharge outlet of the largest possible diameter and acting as a vortex chamber;

Figure 2 illustrates the means by which the torque is transmitted from the engine flywheel to the revolving converter casing;

Figure 3 is a vertical section of the converter taken on line 3—3—3—3 of Figure 1, showing the arrangement of the runner vanes, the reverse gear, and the fluid pump;

Figure 4 represents a half vertical view of impeller;

Figure 5 is a section through a gate taken on line 5—5 of Figure 6;

Figure 6 is an end elevation of the gate shown in Figure 5;

Figures 7 and 8 are side views of contracting packing rings used in stuffing boxes;

Figure 9 is a section through a semi-free vane;

Figure 10 is a section through a flexible vane used on the runner, left for heavy loads, right for light loads;

Figure 11 is an enlarged section through the same vane showing its construction;

Figure 12 is a diagrammatic view illustrating a set of entrance vanes of the guide wheel which are automatically adjustable under the control of the fluid;

Figure 13 is a view similar to Figure 12 showing the position of the second set of semi-free vanes for the guide wheel of Figure 1, left for light loads, right for heavy loads;

Figure 14 is a diagrammatic development of the fixed gates in the same transmitter;

Figure 15 is a view illustrating the positions of the semi-free vanes for the impeller, left at light loads and right at heavy loads;

Figure 16 is a diagrammatic development of the shape of fixed impeller vanes;

Figure 17 is a view illustrating the positions of the semi-free vanes for the runner at the left for light loads, and at the right for heavy loads;

Figure 18 is a diagrammatic development of the shape of the fixed runner vanes in my transmission of Figure 1;

Figure 19 is a half vertical section showing a modified form of torque converter similar to that in Figure 1, but equipped with an impeller having only fixed blades of a non-cell-shaped form with very small blade area;

Figure 20 represents a half vertical section illustrating a modified form of my transmission having a runner with two sets of vanes, first set of vanes being restrained from movement in the direction of rotation of the runner by a one way clutch, but being free to move circularly in the reverse direction;

Figure 21 is a vertical section taken on line 21—21 of Figure 20 showing the one way clutch;

Figure 22 is a half vertical section showing my converter having an impeller, a runner and a guide wheel, each having two sets of vanes, the first set of vanes being free to move circularly in one direction, but restrained from movement in the other direction;

Figure 23 is a half vertical section of my torque converter having an impeller, a runner and guide wheel, each equipped with two sets of vanes, the first set of vanes of the impeller and guide wheel and second set of vanes of the runner being capable of axial displacement to vary the operating length of vanes for changing the angles of the impeller, the runner, and the guide wheel vanes;

Figure 24 is a half vertical section showing a multistage transmission having an impeller and a runner equipped with fixed vanes with total vane area (front and rear surface of vanes) in each stage smaller than twice the area of the surface of revolution generated by the rotation of the impeller or the runner around their axis;

Figure 25 is a half vertical section taken on line 25—25 of Figure 24;

Figure 26 illustrates a half vertical section showing my torque converter having an impeller and a runner, each equipped with two sets of vanes, the first set of vanes being free to move independently relative to the second set of vanes or to be locked to the second set of vanes so as to rotate with it under the control of centrifugal force according to the speed of the second set of vanes;

Figure 27 is a half vertical section taken on line 27—27 of Figure 26;

Figure 28 is a part section taken on line 28—28 of Figure 1 showing an arrangement of mechanism for automatic connection of the runner to the impeller;

Figure 29 illustrates an inner member of the free wheel clutch as used in the embodiment of Figure 1;

Figure 30 represents a vertical section showing a free wheel clutch using a coil spring;

Figure 31 is a vertical section taken on line 31—31 of Figure 30;

Figure 32 shows a vertical section through a pair of roller clutches which may be used in place of the conventional jaw clutches;

Figure 33 is a vertical section taken on line 33—33 of Figure 32;

Figure 34 represents a vertical section showing a synchronizing unit which can be used instead of a free wheel unit;

Figure 35 illustrates an inner synchronizing member;

Figure 36 is a vertical section taken on line 36—36 of Figure 34;

Figure 37 illustrates a modified form of free wheel unit using a multiple disc clutch;

Figure 38 is a vertical section taken on line 38—38 of Figure 37;

Figure 39 shows a half of an outer disc disclosed in Figure 37;

Figure 40 represents a vertical section showing a free wheel unit equipped with a pair of ball clutches;

Figure 41 is a vertical section taken on line 41—41 of Figure 40;

Figure 42 is a vertical section taken on line 42—42 of Figure 40, showing the inner cam member of the forward clutch;

Figure 43 is a diagrammatic development of the shape of the fixed runner vanes used in Figure 46;

Figure 44 shows a runner employing pivoted blades held in position by springs;

Figure 45 is a vertical section of Figure 44;

Figure 46 is a vertical section of my high speed turbo transmission having an impeller operated by planetary gears;

Figure 47 is a diagrammatic view illustrating the shape of the jaw clutches used on the transmission illustrated in Figure 46;

Figures 48 and 49 illustrate a runner wherein each semi-free vane is equipped with a pinion gear, which mesh with a common ring gear;

Figure 50 is a vertical section illustrating my turbo torque converter having a two stage impeller and runner;

Figure 51 is a vertical section of my two stage turbo transmission equipped with radial flow impellers, vortex chamber guide wheel, and an auxiliary turbine;

Figure 52 illustrates various operating positions of a runner vane;

Figure 53 is a half vertical section of a two stage transmitter with two axial flow impellers, and one axial flow runner, each equipped with one set of eccentrically pivoted vanes and one set of centrically pivoted vanes;

Figure 54 shows diagrammatically the positions for guide wheel vanes in the transmission of Figure 53, left for light loads, and right for heavy loads;

Figure 55 illustrates the positions of the first set of impeller vanes;

Figure 56 illustrates the position of the first set of runner vanes, left for light loads, and right for heavy loads; and Figure 57 is a view illustrating one of the runner vanes of the transmission illustrated in Figure 1.

The invention will be fully understood by referring to the accompanying drawings forming a part of this specification, in which:

Figures 1 and 3 illustrate a form of my torque converter equipped with a turbine runner or driven member and an impeller or driving member, with two sets of vanes, and a substantially axially discharging guide wheel with vortex chamber. The apparatus is also equipped with a change speed gear, a brake for secondary shaft, and a mechanism for quick operating of the gear transmission.

The numeral 60 indicates the main part of the fluid tight rotary casing to which a cover 61 is fastened by bolts 62, which engage grooves 64 in a flywheel 63 to transmit any turning moment from the engine fan-shaped flywheel 63 to the cover 61, but permit a relative longitudinal movement of the flywheel and the cover to facilitate manufacture, assembly, and installation, as will be observed in Figure 2. The casing 60 is provided with a stuffing box 65 having contracting metal packing rings 115 and 116, as more clearly illustrated in Figures 7 and 8, and ball bearing 66, and a packing cover 67 for a stationary guide wheel sleeve 68.

The engine flywheel 63 which is equipped with a fan, blows air against the cover 61 to cool it, and is secured to an engine crankshaft 69 by bolts 70. The cover 61 carries a pilot flange 71, bolted to it by screws 72, and is equipped with a ball bearing 73 carrying a runner shaft 74. The cover 61 is capable of taking a thrust load in either direction. Mounted inside of the casing 60, by means of bolts 75, is an impeller assembly as more clearly illustrated in Figure 4. The impeller assembly comprises an impeller web 76, a shroud 77 having vanes 78 fixed thereto, and semi-free vanes 79 rotatably mounted on pins 80. The vanes 79 are pivoted at their leading edges adjacent the outlets from the guide vanes and are capable of adjusting themselves to the rate of discharge from the guide vanes. The inclination of the vanes 79 is limited on both sides by stop pins 81 and 82, which project into the impeller channel and serve as stops as more clearly shown in Figures 15 and 16.

The inlet diameter of the impeller vanes is larger than the discharge diameter of the guide wheel, leaving a bladeless space, or flow adjusting zone between the impeller inlet and the guide wheel outlet where streamlines of fluid may readjust their course. The channel at the entrance of the impeller acts also as a whirlpool or vortex chamber, changing kinetic energy of fluid into potential energy, and slowing down the velocity of flow. In this space more deflected fluid streamlines equalize with the less deflected streamlines which results in homogeneous stream of mean deflection. The fluid is thus free to vary its direction of flow and will approximate that of a free vortex. This vortex chamber is adaptable to varying conditions of flow under the influence of speed, and load, and varies the angle of the flow and therefore decreases the losses due to the changes of flow angles, which has been the greatest objection to turbine transmissions in the past. At the discharge end another bladeless space or readjusting zone is provided to allow the fluid to equalize the greater and less deflected zones of flow.

A bladeless space or adjusting zone is provided between each set of vanes or blades to unify the fluid flow. These vortex chambers and bladeless channels are of great importance since without them the efficiency of the device cannot be kept high throughout the whole range of speeds and loads, unless an infinite number of sets of semi-free vanes were provided, which is of course impractical.

A pipe 83 mounted on the casing 60 is provided for relieving fluid pressure from the stuffing box 65. The space just in front of stuffing box 65 being connected with the high pressure section at low speeds through openings 185. Passageway 184 contains the fluid under pressure so that relief of this pressure is necessary, which is accomplished by a pipe 83 leading to the low pressure portion of the device at the periphery of the guide wheel. At the same time any fluid leakage is automatically and directly returned to the device.

The guide vanes illustrated in Figures 5, 6, 12, 13 and 14 carried by the sleeve 68 by means of the key 84 includes a guide wheel web 85, a shroud 86 attached to the web by the long bolts 87 and 88. Each of the bolts 87 and 88 is provided with semi-free vanes 89 and 90. These semi-free vanes are pivoted at their leading edges, adjacent to the outlets from the runner blades, and adjust themselves to the direction of the fluid discharge from the runner. The fluid thus flows through the guide vanes assembly without shock or impact and is directed to the discharge side of the assembly, where it is delivered through the fixed vanes 91 to the impeller. The pins 92, 93, 94 and 95 projecting into the guide vanes channel serve as stops to limit the movement of the vanes 89 and 90 in both directions as illustrated in Figures 12 and 13. The fixed vanes 91 are secured to the web 85 by the screws 96.

The guide vane channel has a small inlet diameter, but a large outlet diameter which acts also as a whirlpool or vortex chamber to change the kinetic energy of the fluid into pressure energy. In the spaces between the runner and the first set of semi-free vanes and between the different sets of guide wheel vanes the fluid is free to adopt its own manner of motion, which approximates that of a free vortex. In this vortex the pressure increases outwardly, theoretically following the ordinary free spiral vortex law. This vortex chamber is adaptable to varying conditions of flow, speed and load. This guide wheel with the vortex chamber is one of the improvements of this apparatus over that described in my copending application Serial No. 475,278, now Patent No. 2,186,025.

In Figure 14 it is shown that the normal trajectory $O_1O_2$ drawn normal to the flow line through the entrance end of a blade 91 does not intersect the discharge end of the adjacent blade, as illustrated by the trajectory $P_1P_2$. In such a case the blade spaces lose their usual cell-shaped form, forming instead a non-cell-shaped passageway. I have discovered that the non-cell-shaped gates function in a similar way as the flexible vanes described in my copending application Serial No. 475,278, now Patent No. 2,186,025, i. e. at heavy load and slow turbine speed the inflow of fluid being almost radial, the direction of fluid discharging from gates has about 45° inclination. In other words, the fluid flow follows the gates discharging inclination only partly and its deviation is comparatively small. At higher turbine speed the flow entering the guide wheel possesses a considerable circumferential component. The direction of the fluid discharged from the gates is tangential to the gates. It thus appears that the fluid flow follows the gates discharging inclination entirely and its deviation is complete. The result is similar to that which would be obtained if the discharging angle were variable, because the non-cell-shaped guide vanes deflect the fluid flow at heavy loads as if the discharging angle were about 45°. At high speeds they deflect the flow completely according to the actual discharge angle of the gates, say 25°. The short vanes function in a similar way as automatically adjustable vanes.

It should be observed that long fixed guide vanes deviate the fluid flow to the constant discharging angle, the result being that at heavy loads the guide wheel relieves the impeller too much, and causes racing of the impeller and the engine. The velocity of discharge is also too high whereupon grade losses due to friction occur. The short vanes, however, avoid these objections.

When short guide vanes are used, i. e. where the length of the vanes are smaller than their spacing, the impeller and engine speed at heavy loads, or when starting is decreased and racing is prevented. The wetted area i. e. the actual surface of all the gates of the guide wheel is also considerably smaller than the circular area determined by the diameter and the width of the guide wheel, that is the area of the fluid channel at the point of the guide wheel is decreased. This limit was deduced after a consideration of the following factors. Good efficiency and variable deviation of the fluid flow can be secured only if the true length of the gates profile is smaller than the blade spacing, at which time the fluid is guided sufficiently to increase the angular momentum of the fluid flow and the friction losses are reduced.

From Figure 14 it can be seen that area of all the gates would be equal to the area of the channel if trajectories $O_1O_2$, $P_1P_2$ would coincide or when the true length of the gates in the direction of flow would equal the gates spacing. It is of advantage, however, to keep the wetted area as small as possible. In Figure 14 the gates' wetted area is considerably smaller than the channel area because the true length of the gates is substantially smaller than the spacing of the gates. In this case the actual discharge angle of the gates must be smaller than the average discharge angle of the fluid flow at the gates' outlet. The reason for this is that streamlines close to the blades must of course follow the contour of the gates, but the streamlines further between the gates follow the gates' contour only partly, and the whole amount of fluid flowing through the gates only experiences that mean deflection, which corresponds to the effective angles calculated for whole flow and not to the actual gate angles. These actual angles of gates' discharge can be made almost zero in order to deflect properly the fluid passing through the gates, without increasing the number of the gates or their length, by avoiding the usual cell-shaped form of the gates. Following the same line of reasoning the mean deflection of the streamlines, the gates' inlet angle must be increased.

This increase of actual gate entrance angle and decrease of actual gate discharge angle depends also on the number of gates. The smaller the number of gates, the greater the difference between the actual angles of the gates and the mean effective angles of the fluid flow; also the smaller the wetted area of the gates in proportion to the channel area, the greater the difference between actual gate angles and mean effective angles of the fluid flow.

For a large number of gates, or when the gates are long, or when the wetted area of the gates is considerably greater than the channel area, the mean effective fluid flow angles will be equal to the actual angle of gates. For a limited number of gates having small wetted area the entrance angle of the gates must be larger, and the discharge angle of the gates must be smaller than calculated or the mean effective angles of the fluid flow. In other words the curvature of the gates must be increased when number of gates and their wetted area is decreased.

It is the ratio of the wetted area of the gates to the annular area of the guide wheel, as well as the ratio of the true gate length to the pitch which influences the mean effective deflection of streamlines. The gates' outlet angle can be considerably reduced below the values used in ordinary practice, and gate discharge angles of zero, or even below zero, i. e. negative, can be used, if the wetted gate area is reduced or if the spacing is increased sufficiently.

As the difference between the discharge angle of the vanes and the calculated effective angle of the fluid flow increases, a smaller number of the vanes may be employed or smaller vanes having smaller wetted area may be employed, or shorter vanes spaced at a greater distance apart may be used. It is obvious of course that this property of the vanes with limited guidance does not start suddenly at any definite point, but appears gradually as soon as the guidance of the vanes is sufficiently reduced, i. e. as soon as guidance is less effective than the guidance of cell-shaped type vanes. The simplest way to find the correct number of vanes to use, or the proper spacing of the vanes to give the best results is to measure the angle of the fluid flow and compare it with the discharge angle of the known vanes. In other words the best way is to determine the number, spacing or area of the vanes experimentally, i. e. to reduce the guidance of the vanes until the difference in fluid discharge angle and vane angle is sufficient to cause variability of the discharging angle according to the fluid entrance angle, then the vanes function in a similar way as automatically adjustable vanes.

The runner assembly, more clearly illustrated in Figures 3, 17 and 18 comprises, a web 97 rigidly mounted on a shaft 74 by means of a taper fitting 98, key 99, a nut 100, a shroud 101, bolts 102 and 103 fastening the assembly together. Each of the fixed vanes 105 is provided with lugs 106 and 107 to fit in corresponding slots 108 in a shroud 101, and 109 in web 97 respectively for the purpose of securing the vanes rigidly in the correct position.

Each of the bolts 103 carries a semi-free vane 110 more clearly illustrated in Figure 9. These vanes are pivoted at their leading edges adjacent the outlet from the impeller vanes, and adjust themselves to the direction of discharge from the impeller. The fluid therefore flows through the runner channel without shock or impact, to the discharging side of the assembly. Pins 111 and 111A projecting into the runner vanes channel serve as stops to limit the movement of the vanes 110 in both directions.

The inlet diameter of the fixed runner vanes 105 is much smaller than discharge diameter of the impeller. The semi-free vanes 110 are not active as driven vanes at high speeds and light loads as indicated in Figure 17, left. Fixed impeller vanes 78, having a discharge angle C approximately 90 degrees to the tangent are illustrated in Figure 16; however, any other desired angle can be used. It will be observed that Figure 17, left, shows semi-free vanes 110 having a 90-degree angle to the tangent. Comparing velocity diagrams in Figures 16 and 17 it will be noted that the impeller discharge angle at high speeds is equal to the entrance angle of the semi-free vanes of the runner.

In this way a vortex chamber is created between the impeller outlet and the fixed runner vanes of the inlet to change pressure energy into kinetic energy. In this space the fluid is free to adopt its own manner of motion which is that of a free vortex. In this vortex the pressure decreases and the velocity increases inwardly, theoretically following the ordinary free spiral vortex law. In this way the fluid velocity on the fixed runner vanes can be increased to such an extent that a comparatively slow speed curvature of the vanes can be used for the fixed vanes 105 and still the runner can operate at very high speeds. In the vortex chamber there is no energy or torque imparted to, nor extracted from, the fluid. From the fact that the change of the angular momentum equals zero, I can determine the velocity $S'$ of the whirling fluid at the runner entrance when the circumferential component of the fluid velocity $s^0$ at impeller exit is known.

$$r^0 s^0 - R' S' = 0$$

then:

$$S' = s^0 r^0 / R' \qquad (1a)$$

where $r^0$ equals the radius of the impeller exit and $R'$ equals the radius of the runner inlet.

It is known from textbooks on hydraulics (Gibson—Hydraulics, pages 502-526 and 628-654) that;

$$\cot B = (U' - S') : f \qquad (2a)$$

where $B$=runner entrance angle, and $U'$=the linear velocity of the runner at the entrance thereof.

From this consideration it is obvious that the entrance angle depends on $U'$, which again depends on $R'$. Further the whirling velocity of the fluid depends on $U'$, which again depends on $R'$. Further the whirling velocity of the fluid $S'$ is dependent on the ratio: $r^0/R'$, consequently the entrance angle also depends on ratio $r^0/R'$.

In order to design an efficient turbo-transmitter the entrance angle must be calculated from Formulas 1a and 2a and the ratio $r^0/R'$ must be carefully selected.

In Figure 17, left, it is shown that the semi-free vanes 110 possess a greater angle (about 90 degrees), to the direction of rotation than is the entrance angle of the fixed vanes 105 (Figure 18), because the entrance diameter of the vanes 105 is considerably smaller.

The effect of the vortex chamber and relationship of the vane angle and the diameter of the vortex can be computed as follows:

A rotary blade wheel located at the exit from a vortex chamber must possess an inlet vane angle calculated from Formula 2a $$\cot B = (U' - S') : f$$

If the rotary blade wheel were located directly at the inlet in the vortex chamber it must possess an inlet vane angle calculated from formula $$\cot B^0 = (u^0 - s^0) : f \quad (2 \text{ inlet})$$

where: $U'$=the linear velocity of the blade wheel, and $S'$=the velocity of the whirling fluid at the exit from the vortex; while: $u^0$=the linear velocity of the blade wheel, and $s^0$=the velocity of the whirling fluid at the inlet to the vortex and $f$=the velocity of the flow.

The angular velocity of a rotary blade wheel must be the same, whether it is located at the inlet or the outlet of the vortex, because the vortex does not change the amount of energy nor the turning moment of the fluid. It thus appears that $$U' = u^0 R' / r^0 \quad (3a)$$

Substituting for $U'$ from Equation 3a and for $S'$ from Equation 1a into the Formula 2a, I get:

$$\cot B = (u^0 R' / r^0 - s^0 r^0 / R') : f \quad (4a)$$

Divising Equation 4a by Equation 2 inlet and substituting

Slope of the angle $$B = tg\ B = 1/\cot B \quad (5a)$$

I have:

Slope of B/slope of $$B^0 = \left(\frac{u^0}{s^0} - 1\right) : \left(\frac{u^0 R'}{s^0 r^0} - \frac{r^0}{R'}\right)$$

Finally putting $u^0/s^0 = m$, and $r^0/R' = p$, I get:

Slope of B/slope of $$B^0 = (m-1) : (m/p - p) \quad (6a)$$

Equation 6a shows how the slope of the vane entrance angle of a rotary wheel depends on the ratio $m$ of linear velocity to whirl velocity, and upon the ratio $p$ of vortex entrance and discharge radii, or how the slope of the entrance angle can be changed by the vortex ratio $p$. The slope of $B^0$ determines the blade entrance angle of a rotary wheel when no vortex is interposed between rotary blade wheels, and slope B determines the correct blade angle when the vortex chamber is interposed between the rotary blade wheels.

A secondary shaft 74 associated with a spur gear pinion 118 is supported by a ball bearing 112 held in place by a nut 113 and provided with metal packing rings 114, similar to those shown in Figures 7 and 8 together with the compression spring 117.

The sleeve 68 is fastened to the housing 119 by means including the bolts 120, key 121, flanges 122 and 123, which housing is bolted to the engine flywheel housing 124 by bolts 125. The case 192 fixed to the housing 119 serves also as a case for a reverse gear, which can be of any well-known construction, but I prefer a sliding jaw clutch of the type in which a splined "free clutch unit" is shifted by a foot pedal 126 or by a hand lever 127. A third shaft or sliding shaft 128 is supported by a roller bearing 130 and by a ball bearing 129, the latter being secured by a nut 131, is carried through a packing 132 and is provided with a taper fitting 133 for connection with a propeller shaft (not shown) to drive the vehicle. The shaft 128 carries a freely rotating gear 134, meshing with an idler reverse gear 135, which constantly meshes with a gear 136 mounted on a countershaft 137 carried by bearings 138 and 139. The countershaft is provided with a spacer 137A and with another constant mesh gear 140 meshing with pinion 118.

The "free clutch" device operates to momentarily disconnect the vehicle drive from the runner and is embodied directly in the transmission. This unit permits easy shifting between "forward" and "reverse" gears without the necessity of bringing the vehicle to a complete stop before shifting, as is necessary in shifting the ordinary gear transmission in "reverse," to avoid clashing the gears or otherwise damaging the vehicle.

These novel features are obtained through the use of the "free clutch unit," which is located as a shifting member between the forward gear 118, and reverse gears 134. This unit consists of an inner screw member 141 more clearly illustrated in Figure 29, splined to the main driven shaft 128 which is free to move forward to position A or backward to position B. In Figure 1 the member 141 is shown in the neutral position, that is when "free wheeling," insofar as the jaws 142 and 143 will permit, may be effected. The periphery of this member carries a right-hand screw thread and it is provided with an outer shell or sleeve 144 having internal jaws 142 and 143 at either end arranged to engage corresponding toothed clutch members 145 on the forward pinion gear or 146 on the reverse gear. This combination of inner and outer members is arranged so that driving torque will be transmitted from the outer member through the screw thread to the inner member and thence to the main driven shaft 128, in the driven direction, position of member 141, "A" for forward direction and position "B" for reverse direction.

With such a device embodied in the transmission, as soon as the force due to the inertia of the vehicle tends to make the vehicle travel at a higher speed than that corresponding to the engine speed, or when the vehicle overruns the engine, the vehicle is automatically disengaged for a definite number of revolutions determined by the number of turns which member 141 can make while turning in the outer member 144, when moving from the position "A" to the position "B." As soon as inner member 141 reaches the opposite position, that is the position "B" for forward speed, the overrunning of the vehicle is stopped, and the "one way" clutch action is terminated. The engine can then be used for braking purposes, a feature which is impossible with the ordinary one way clutch.

The "free clutch unit" makes an exceptionally easy shift, for even though the speeds of the two gears that must mesh when engaging reverse are opposite or when engaging a low speed gear of any well-known construction used on automotive designs, there is only the negligible inertia of the clutch sleeve 144 to overcome in order to effect the engagement. As a result, even if neither the secondary shaft 74 nor the third shaft 128 are brought to a complete stop the shift still can be made, since only a mere click will result. All that is necessary is to slow down the vehicle and to relieve the accelerator pedal for a moment when the shift is made, so the "momentary one-way" clutch can come into action, to disengage the secondary and the third shaft for a short period of time.

Shifting of the clutch sleeve 144 is accomplished by a fork 147 on a shift rod 148, having the customary slots. The rod 148 is secured in the proper position by the usual ball and spring not shown. The shift rod 148 is secured by a pin 153 to a lever 149 pivotally supported by lugs 150 on gear transmission plate 151. Fastened to the lever 149 is a link 152 connected to a pedal lever 154, pivotally supported by arms 156 on the gear transmission cover 155. The lever 154 is equipped with the pedal 126, and a lever 149 having a pedal 157 and a hand lever 127 is provided. When the pedal 157 is pressed forward, the pedal 126 moves backward, and the fork 147 and the sleeve 144 move forward and vice versa. When the operator steps on the pedal 126, the sleeve 144 is shifted into "reverse." When desired, the hand lever 127 can also be used for shifting.

Because of the fluid friction and the efficiency of the drive on long non-stop trips, it is desirable to connect the runner directly to the impeller for "direct drive." This can be accomplished by a centrifugal clutch, the cover 61 of which is formed with a toothed rim 160 as illustrated in Figure 28, adapted to be engaged by a pawl 161 pivotally supported at 162 by the runner web 97, under the control of the centrifugal force of the weight 163 carried by an arm 164 integral with the pawl 161. The deflection of the centrifugal governor under the control of the centrifugal force is counteracted by a spring 165.

Associated with the pawl 161 is a second pawl 166, adapted to be engaged with the toothed rim 160 by means of the spring 165, whenever there is a tendency for the secondary shaft to overrun the engine shaft i. e., when the inertia of the vehicle tends to make it travel at a higher speed than that corresponding to the engine speed. This frequently happens when it is necessary to descend long steep mountain grades "on the gears," in order to save the regular brakes.

When the pawl 166 is engaged with the rim 160, driving torque can be transmitted from the propeller shaft to the engine and consequently the engine can be used as a brake. Of course this action takes place only when the vehicle speed is less than the predetermined speed at which the pawl 161 engages the rim 160. Above this predetermined vehicle speed the vehicle is "free wheeling." Under this predetermined speed, the engine serves as a brake whenever there is a tendency for the vehicle to overrun the engine. This arrangement thus combines economy of "free wheeling" at high speeds, and safety of "engine brake" at lower speeds, which is desirable.

In operation, when the secondary shaft is at rest or is rotating at slow speed, the spring 165 maintains the pawl 161 out of engagement with the toothed rim 160, so that no torque can be transmitted from the rotary cover 61 to the runner web 97 directly, and all torque must go through the fluid transmitter. At high speed of the secondary shaft the centrifugal governor 163 overcomes the resistance of the spring 165, and maintains the pawl 161 into engagement with the toothed rim 160 so that the runner is caused to rotate together with the cover 61. The engine then operates directly with the secondary shaft. Whenever the runner speed decreases below a certain predetermined limit, the spring 165 disengages the pawl 161, and my device becomes a torque converter again. All that is necessary is to release the engine accelerator for a moment to allow the pawl to disengage.

In order to slow down the runner or to bring it to a stop in a shorter time, I have provided a brake shoe 450 fastened rigidly to a rod 451 operated by a bell crank 452 pivoted at 453, and a pedal 454. Pressure on the pedal 454 forces the brake shoe 450 against the periphery of the gear 118 to cause a braking effect upon the driven shaft 74.

With reference to the fixed runner vanes 105, illustrated more clearly in Figures 3 and 18, I prefer almost radially discharging tips, or only slightly curved backwards. This form diminishes the angle variations of the fluid flow entering the guide vanes and, therefore, causes smaller hydraulic losses. The floating vanes 110 are inoperative at high speeds of the runner, since the relative velocity of the incoming fluid is comparatively small. At heavy loads, however, the relative velocity of the fluid flow increases and the vanes 110 become driven vanes as indicated in Figure 17, right. This is the reason for the provision of the stops 111.

The shape of the flexible runner vanes 110A is shown at the left in Figure 10 for heavy loads, and at the right for light loads. Attention is directed to the fact that the entrance edge at heavy loads is curved forward, but at light loads it is curved backwards. This is due to the motion of the fluid relative to the runner vanes. This is the reason why the runner with fixed and forward curved vanes are efficient at low speeds and become inefficient when speed of the runner approaches the speed of the impeller. For this reason I have provided the runner with semi-free vanes 110 which are active only at low speeds, but which do not function at high speeds. The entrance edge of the fixed vanes 105 is designed to have the correct angle at high speeds and at light loads as indicated in Figure 18. This is an improvement over the invention described in my copending application Serial No. 475,278, now Patent No. 2,186,025.

Comparing Figures 17 and 18 it is apparent that the entrance angle of the semi-free vanes at low speed must be small as indicated on Figure 17 at the right wherein the angle is about 30 degrees. At the same time the mean effective angle of the fluid flow at the discharge of the impeller, as indicated by the flow velocity triangle of Figure 16, right, is only about 15 degrees or smaller. The mean effective angle of the fluid flow at the entrance to the semi-free vanes as indicated by the fluid velocity triangle of Figure 17, right, is also about 15 degrees or smaller, while the discharge angle of the fixed runner vanes 105 is about 90 degrees.

It can be seen in Figure 17, right, that semi-free vanes 110 are at an angle to the flow in a similar way as the aeroplane wings are at an angle of incidence to the direction of flight, and therefore the vanes 110 must be of aerofoil or teardrop shape, as shown in Figure 9, which also materially decreases the head resistance at high speeds of the runner when they are not active. The streamline shape and the angle of incidence of the semi-free vanes combined with the large discharge angle of the fixed runner vanes 105 facilitates efficient changing of the fluid kinetic energy into pressure energy at low speeds. In this way location of stops 111 is determined.

Figure 11 illustrates the detailed construction of the flexible vanes 110A. At the entrance edge, a metallic clamp 170 is pivotally supported at 173, and is riveted to a rubber, leather, or other flexible plate 172. The discharging tips 171 are formed from sheet metal slidably supported by a bolt 174.

A turbine power transmission using a runner or an impeller as shown in Figures 10 and 11 possesses a feature of flexible blades supported in such a way that the angles of the entrance and the discharge automatically adjust themselves under the control of the fluid flow.

Another important item is the problem of balancing the axial thrust, since enormous pressures can be produced in the bearings which would endanger their life, and decrease the reliability of the device.

In Figure 1 it will be observed that the side thrust of the fluid against the runner web 97 are not equal, because the entrance and discharge channels take part of the area on the right side of the web and consequently the total pressure on the right hand side is diminished. The left-hand side of the web, however, is completely under pressure through spaces 170, 171, 172 and 173. The total pressure against the runner web from the right, that is the rear, would be smaller than the total pressure from the left or front. To avoid these objectionable features a number of holes 174, 175 and 176 are drilled in the web to equalize the pressures on the right and left sides of the runner web.

In order to minimize short circuit losses through the openings 177, 178 and 179, clearance spaces 180, 181, 182 are provided. Similarly holes 183, 184 and 185 are drilled in the guide wheel web 85 in order to balance fluid pressures against this web. Clearance spaces 186, 187, 188 and 189 are also provided to decrease short circuit losses.

The transmitter casing 60 is completely filled with a fluid, preferably oil. In order to make stuffing boxes permanently tight and to reduce wear of the packing contraction split rings 114, 115 and 116 illustrated in Figures 7 and 8 are provided. These rings are preferably made from a springy metal so as to withstand considerable wear. These rings act in a manner similar to the piston rings of an engine, and produce a pressure against the shaft 74, sleeve 68 and the casing 60, as well as against each other both radially and axially, due to their triangular shape, and due to the pressure of the spring 117. The force of the rings 115 and 116 is adjustable by means of a gland 67, which eliminates any clearance which might occur due to natural wear.

The flange 123 is provided with a fluid collecting groove 190, the discharge end 191 of which runs into the gear case 192. The fluid level in the gear case is located well under the shaft 128. Any fluid which passes the packing rings 115, 116 and the gland 67 is drained into the gear case which serves also as a reserve tank for the fluid which is used in the transmitter. The mechanism which delivers fluid back to the casing 60 from the gear case 192 consists of a hole 193, a check valve 194, and a pipe 195 leading to the transmission through the sleeve 68. The inlet opening of the hole 193 is provided with a chamber 196 as indicated in Figure 3, located close to the periphery of the gear 140. The fluid is driven into the chamber 196 and further into the transmitter, by the teeth of the gear 140. The fluid cannot escape from the case 60 through the pipe 195, as the pipe is closed by the check valve 194.

With reference to the runner vanes 105 and 110, their shape at low speed indicated in Figures 17 and 18 at the right is more similar to the stationary guide vanes used in the so-called "turbine pumps" for changing the water velocity into pressure. My runner vanes are substantially divergent and the inlet angle thereof is smaller than the discharge angle, while the entrance vane angle of the ordinary water turbine is larger and the vane angle at the exit is smaller. In my device, however, at overloads the fluid energy is not entirely absorbed in the runner, and therefore must be transferred back to the pump. If guiding vanes of the guide wheel could be made perfectly flexible and have correct entrance angles at all speeds, the exit angles of the runner vanes could be small. Since the vanes I prefer are not flexible, there would be losses at heavy loads, where the fluid discharging from the runner would stream backwards and strike against the guide vanes. It is better in my device to change a large part of the kinetic energy into pressure energy and thus avoid shock losses due to too variable an angle of fluid discharge. For the same reason I have designed my runner with the smallest possible discharge diameter, in order to keep the circumferential velocity component as low as possible.

In operation, referring to Figures 1, 12 and 18, inclusive, when the fluid enters the ring of semi-free vanes of the runner its velocity at slow speed of the runner is great and the fluid impinges on the faces of the vanes 110 which are restrained from backward movement by the stop pins 111. At high speeds of the runner the velocity of the fluid relatively to the runner is slow and the fluid impinges on the backs of the vanes 110 which move in the direction of the fluid and offer negligible resistance to the flow of the fluid which therefore increases its velocity according to the law of free spiral vortex and encounters the vanes 105, where its energy and angular momentum is extracted.

At high speeds of the runner the fluid leaves the vanes 105 with a velocity which has a circumferential and an axial component but the fluid has no pressure (Figure 18 left). At low speeds of the runner, however, the fluid leaves the vanes 105 with a velocity which has an axial component only, and no circumferential component; however, the fluid possesses a great pressure (Figure 18 right). The velocity diagrams 16 and 17, left, show that for shockless fluid entrance in the runner at high speeds, when there is only small difference in runner and impeller speeds, the entrance angle, that is the angle between the relative fluid flow velocity W and the tangent to the runner, of the runner vanes must be substantially equal to the discharge angle, that is the angle between the relative flow velocity $w$ and the tangent to the impeller, of the impeller vanes.

All forward speeds of the vehicle are controlled by the engine accelerator only. The change of the gearing ratio and the increase of the torque is automatic, since the increase of the loading at road wheels slows the runner down and it rotates more slowly in relation to the impeller. At idling speed the impeller does not pump sufficient fluid into the runner to drive the vehicle. The car commences to move as the throttle valve is opened. As the engine is speeded up, the fluid energizing becomes more effective, and the vehicle begins to move. At a certain predetermined speed of the runner the centrifugal governor connects the runner to the impeller and then the engine operates directly with the secondary shaft 74, and the flow of the fluid in the transmitter stops because of the resistance of the centrifugal force of the fluid in runner channel, hence all hydraulic losses at "direct drive" are eliminated.

Finally, I have designed my turbo torque canverter so it can be easily manufactured. Each of shafts 74, 128 and 137 is supported by two bearings only so as to keep them readily in line. The transmission as an independent unit is easily attached to the engine flywheel housing by a few bolts, and with the driving studs 62 entering into the slots 64 of the flywheel 63.

In Figures 19 to 27 inclusive and 43 to 56 inclusive, the numerals 200 to 209 inclusive indicate the primary or driving shafts, and the numerals 210 up to 219 inclusive and 221 and 222 indicate the secondary or driven shafts. The numerals 223–233 inclusive indicate the primary or driving wheels with blades mounted and secured to the primary shafts. The numerals 234 to 246 inclusive indicate the secondary or driven wheels equipped with driven blades and mounted rigidly to the secondary shafts, except the wheel 241 in Figure 46 which is not fastened to the secondary shaft 217, but rather to the casing 330. The numerals 247 to 256 inclusive are the third non-revolving redirecting guide wheels and blades. The numerals 257, 258, 379 and 395 indicate semi-free vanes for the runners, freely pivoted at their leading edges, and provided with stops, their function being the same as that of the vanes 110 (Figure 17). The numerals 259 to 262 inclusive indicate semi-free vanes for the impeller, which function in the same way as the vanes 79 in Figure 15. The numerals 263 and 264 indicate semi-free vanes for the guide wheels, and their function is the same as that of vanes 89 illustrated in Figure 12.

The embodiment of the invention illustrated in Figures 20 and 21 relates to fluid turbine torque converters having blade wheels including relatively rotatable sections which, in order to enable them to have relative rotation are secured to concentric rings or the like, which may rotate independently relative to each other and to a common supporting shaft, or may be locked to the shaft to rotate therewith. These figures show means in connection with such blade wheels whereby the movable blade wheel sections may be automatically locked to the common shaft and to each other or released therefrom depending on the relative angular velocity of the members resulting from the load on the power transmitter, so that the device may automatically adjust the turning moment produced by its runner to correspond to the requirements at any load, in order that the high efficiency of the device may be obtained at various loads and particularly at high speeds.

Figure 21 illustrates means comprising a roller type one-way clutch carried by the shaft 211 and adapted to engage a blade section 270 by means of rollers 271, springs 272 and cams 273. The rollers being in frictional engagement with the hub of the blade section 270 so as to be caused to engage the section when the velocities of blade sections 270 and 235 vary with respect to each other in the one direction, while being released from engagement, when the velocities vary in the opposite direction.

In operation, at high speeds, the blade section 270 will rotate at a speed lower than that of the runner blade section 235 corresponding to its angle of inlet as well as to its diameter. The entrance angle of the section 235 is designed for high speed, while the entrance angle of the section 270 is determined for low speed. If for any reason the speed of rotation of the inner blade section 235 decreases to a value below that of the blade section 270, the latter will be rigidly coupled to the shaft 211 so as to rotate therewith as a unit due to the action of the one-way clutch illustrated in Figure 21. In this way the turning moment of the blade section 270 will be transmitted to the shaft 211.

If for any reason the speed of the runner increases, the outer blade section 270 will uncouple in a fully automatic manner. It is understood, however, that while in the construction described only one freely movable blade wheel section is shown, more than one such concentric section may be employed if desired.

Basically the runner illustrated in Figure 20 is a blade wheel comprising relatively rotatable concentric sections, and automatic means carried by one of each of two adjacent sections to effect coupling and uncoupling of the sections with respect to each other under the control of the other adjacent section and according to their relative velocities.

Figure 22 illustrates diagrammatically a turbine converter where the impeller, the runner as well as the guide wheel are each designed as a blade wheel comprising relatively rotatable concentric sections as described in Figure 20. The numerals 274, 276 and 278 indicate the entrance blade wheel sections for the impeller, the runner, and the guide wheel. The numerals 275, 277 and 279 indicate one-way clutches or ratchets for the purpose of effecting coupling when the velocities of the sections vary with respect to the impeller, the runner and the guide wheel in the one direction, and uncoupling, when the velocities vary in the opposite directions. In this way the efficiency of the device is maintained high at all speeds and ratios of gearing.

The embodiment of the invention illustrated in Figure 23 is characterized by the fact that the blade wheels of the device, that is the impeller, runner, and the guide wheel are provided with concentrically movable blade sections 290, 291 and 292 capable of axial displacement to vary the angles according to the operating load for the purpose of high efficiency at all speeds. With the movable blade portions pulled out of the blade wheel passage, each blade wheel will operate only with the fixed blades.

Movement of the blade section is effected automatically by pressure of the circulating fluid. The slower the runner speed, the stronger the circulation and the greater the fluid pressure, hence at low speed the blade sections will be pulled out into positions C, D, E, because the fluid pressure overcomes the pressure of the springs 293, 294 and 295. At high speeds blade sections will be returned to the passage by means of the springs.

In a three stage converter, as illustrated in Figures 24 and 25, the impeller wheel 227 is mounted directly on the engine crankshaft 205. This shaft receives oil through a pipe 296 from an engine oil pump (not shown) whenever oil leaks out of the converter stationary housing 297. Additional oil immediately enters from the crankshaft hole 298, through an opening 299 in the converter. The gates 300 of the stationary guide wheel 251 are adjustable through a lever 301 while the device is in operation. Each gate is rigidly secured to a stem 302 equipped with a lever 303 and a connecting link 304 which link is pivotally fastened to a flange 305. This flange can be moved by means of a fork 306 connected to the lever 301, and by means of a pin 307 secured to a flange 305. When the lever 301 is pulled in the direction of the arrow in Figure 25 the flange 305 is rotated, and the link 304 with the lever 303 moves from the position S₁ into a new position T₁ as shown by the dotted line in Figure 25. The gates 300 turn from the position S into the position T. In this way the angular position of the gates and the discharge angle of their vanes 300 can be regulated. Each of the impellers and runners has vanes, the total area in each stage being smaller than twice the area of the surface of revolution generated by the rotation of the impeller or the runner around their axis. In this way I have reduced the friction and shock losses caused by the flow of fluid passing through the impeller and the runner, for the fluid is guided as little as possible, by keeping the wetted area small.

The device illustrated in Figures 26 and 27 comprises blade wheels, impeller, runner, and guide wheel, including relatively rotatable sections which may rotate independently relative to each other and to a common supporting shaft, or may be locked to each other to rotate together. The design of the blade sections is similar to that disclosed in Figure 22 but the coupling means whereby the movable blade sections of the impeller and the runner may be automatically locked to each other or released therefrom are different than those described in Figure 22. The locking means for the guide wheel entrance section 308 is a one way clutch 309 similar to that shown in Figure 21.

The entrance blade section 310 of the impeller wheel 228 is provided with a hub 311 which is rotatably mounted on the impeller hub 312. The web of the blade section 310 is formed with a toothed rim 313 adapted to be engaged by a pawl 314 pivoted at 315 to the impeller wheel 228. The other end of the pawl 314 carries a weight 316 which functions as a centrifugal governor, the deflection of which under the control of the centrifugal force is counteracted by a compression spring 317.

In operation, when at heavy loads the impeller speeds up due to the energy returned to the impeller by the stationary guide vanes, the centrifugal governor maintains the pawl 314 in engagement with the toothed rim 313, so that the blade section 310 is caused to rotate with the impeller. At lighter loads and lower speeds of the impeller the centrifugal governor deflects under the pressure of the spring 317, thereby causing the pawl to release the toothed rim 313 so as to allow the blade section 310 to rotate freely at the speed determined by the blade angle of said section without absorbing or yielding any work. The entrance angle of the blades of section 310 is designed for heavy loads, while the entrance angle of blades of the impeller 228 is determined for light loads.

Similarly the entrance blade section 318 of the runner is provided with a hub 319, which is rotatably mounted on the secondary shaft 215. The hub is formed with a toothed rim 320 adapted to be engaged by a pawl 321 pivoted at 322 to the runner wheel 239. The pawl carries at one end, a weight 460 which functions as a centrifugal governor, the deflection of the governor under the control of the centrifugal force being counteracted by a compression spring 323.

In operation, when the secondary shaft is at rest or rotates at low speed during heavy loads, the centrifugal governor maintains the pawl 321 in engagement with the toothed rim 320 so that the blade section 318 is caused to rotate with the runner. At a higher speed of the secondary shaft the centrifugal governor overcomes the pressure of the spring 323, and causes the pawl to release the toothed rim 320 so as to allow the blade section 318 to rotate freely at the speed determined by the blade angle, without yielding any work. The entrance angle of the blades of the section 318 is designed for heavy loads while the entrance angle of the main runner blades 239 is determined for light loads and high speeds of the runner. In this way the entrance angle of the impeller and the runner will be correct at heavy loads as well as at light loads.

Principally the runner and the impeller include wheels with blades having independently movable blade portions, concentric members carrying the movable portions, means adapted to lock the members to each other or to release them therefrom, and a control mechanism to automatically control the operation of the locking mechanism.

The runner shown in Figures 44 and 45 comprises a web 324, a shroud 325 and movable blades 326 eccentrically pivoted at 327. Tension spring 328 holds the blades 326 in position. The stronger the fluid flow the more the blades deflect, due to the fluid pressure exerted against them because of the fact that the entrance and discharge angles can be automatically adjusted under the control of the fluid flow. Position L is for low speed and position H is for high speed of the runner. It is evident that the same design using eccentrically pivoted vanes held in position by a spring and automatically adjustable by the fluid flow can be used also for the impeller as well as for the guide wheel construction.

Basically the torque converter with a runner or impeller disclosed in Figures 44 and 45 represents a fluid device having a radial flow runner or impeller, and a guide wheel. The runner or the impeller or both are equipped with eccentrically pivoted vanes adjustable automatically under the control of the operating fluid.

The form of my invention illustrated in Figures 43, 46 and 47 is especially adapted to transmit great amounts of energy while the dimensions of the turbine transmission remain comparatively small. This great capacity of the device is due to the use of planetary gearing. The numeral 330 indicates a casing to which a runner assembly 241 is suitably fastened. This casing may be attached to the crankshaft of a power engine or to any driving shaft 207. The runner is provided with long blades 331, and short blades 332 as illustrated in Figure 43. Within the casing is enclosed an impeller assembly 229 provided with an internal gear 333 and with a hub 334 rotatably mounted on the hub of a sun gear 335, which is rigidly secured to a secondary shaft 217. The casing 330 is provided with spindles 336 which are held in place upon the casing by a nut 337, or by other suitable means. On each of the spindles a planet gear 338 is rotatably mounted to mesh with both the internal and sun gears. A stationary guide wheel 253 is located within the casing and is secured rigidly to a stationary sleeve 339 which is connected with a gear case 340. This gear case contains constant mesh gears 341 and 342, reverse gears 343, 344 and 345 (not shown), emergency low gears 346 and 347, a jaw clutch 348, electrically operated by a switch 349, and a third shaft 350. Leakage of the fluid is prevented by a stuffing box consisting of metallic discs 351 and 352, packing 353 and a spring 354A, which all rotate with the runner, thus avoiding rapid wear of the packing.

The operation of this device is as follows. It is to be observed that the spindles 336 rotate at the speed of the driving shaft 207, the rotation of which is to be transmitted to the secondary shaft 217. If the driving shaft runs at slow speed, the driven shaft 217 will remain stationary, for the reason that at a slow rotation of the driving shaft and the impeller also revolves slowly and there is not enough turning effort required by the impeller to resist revolving of the planet gear. Under these conditions the sun gear is stationary, and the planet and internal gears revolve in the direction of the driving shaft rotation. Obviously as the impeller 229 is being rotated the fluid flows through it thereby receiving energy which is transmitted to the turbine wheel 241, rigidly connected to the casing 330 through which the fluid streams to the guide wheel where additional angular momentum is imparted to the fluid. The fluid is then returned to the impeller. As the speed of the driving shaft increases, rotation of the planet and the internal gears as well as the impeller increases, and the turning effort necessary to maintain the impeller rotation increases with the square of impeller speed. A turning moment is therefore transmitted by the planet gears to the sun gear and to the secondary shaft 217, until the resistance of the driven wheels of the vehicle is overcome whereupon the vehicle accelerates and the sun gear starts to revolve.

As soon as the sun gear begins rotating the planet gears' rotation about spindles slows down and consequently the internal gear and the impeller also slow down. When the vehicle is brought to a predetermined speed, acceleration of the vehicle stops and the torque of the secondary shaft decreases. The torque of the impeller must, of course, decrease in the same ratio as the torque of the secondary shaft, both being driven by the same planet gears, until the impeller, the runner, and the secondary shaft all revolve at approximately the same speed. The planet gears then stop rotating about their spindles and the internal gear and the sun gear revolve at the same speed. If now a greater load is applied to the driven shaft, torque applied to the sun gear increases, and this gear will slow down. The planet gears will then start to revolve about their spindles and the internal gear and the impeller will speed up until the force on the planet gear teeth due to the internal gear and the sun gear is balanced. From this it appears that whenever the load applied to the secondary shaft increases, the impeller speeds up beyond the driving shaft speed with the result that the torque applied to the secondary shaft gradually and automatically increases.

It is to be noted that the total energy brought to the spindles from the driving shaft is divided by the planet gears into two parts, one part goes to the sun gear and to the secondary shaft, another part goes to the internal gear and through it to the impeller, from the impeller to the runner, and from the runner back to the spindles.

At standstill no energy is absorbed by the secondary shaft and therefore all the energy comes back to the spindles (neglecting losses in friction, eddy currents, etc.). At the same time the turning moment $t_r$ of the runner is greater than the turning moment $t_i$ of the impeller owing to action to the stationary guide wheel 253.

$$t_r - t_i = i \qquad (1)$$

being the increase due to guide wheel. Calling the torque of the primary shaft $t_1$, that of the secondary shaft $t_2$, and turning moment of spindles T, we obtain the following equations:

$$T = t_1 + t_2 \qquad (2)$$

because the spindles drive the impeller and the secondary shaft; further:

$$t_1 + t_r = T \qquad (3)$$

i. e. torque of the driving shaft plus torque of the runner brought back to the spindles equals turning moment of spindles. Then:

$$t_1 + t_r = t_1 + t_2$$

from which:

$$t_2 = t_1 + t_r - t_i = t_1 + i \qquad (4)$$

therefore; the torque of the secondary shaft equals the torque of the primary shaft plus the increase of the torque due to the guide wheel.

At high speeds when the runner revolves nearly as fast as the impeller, the increase in the torque is about zero and the torques of the primary and secondary shaft are equal.

In Figure 43, I have shown the development of the runner blades 331 and half blades 332 (similar design, of course, can be used for the impeller, blades 229A and the guide wheel, gates 253A). It is apparent that the normal trajectory $K_1K_2$, drawn normal to the flow lines through the end of a long blade 331A does not intersect the adjacent blade 331B, see trajectory $M_1M_2$. In such a case the blade spaces lose their usual cell-shaped form, forming instead a "non-cell-shaped" passageway. However, in Figure 43 the half blades 332 are added, so the discharging half of the blades is of the usual cell-shaped form, but the entrance half of the blades 331 is of the non-cell-shaped form. This construction reduces the losses which are due to entrance angle of the fixed vanes not being correct at various speeds, because the fluid is partly guided by the entrance tips of the vanes 331 before it strikes the more numerous and the cell-shaped half blades 332.

Shifting in "direct" or "reverse" is accomplished by sliding the jaw clutch assembly 348 axially on the spline 364 of the third shaft by means of an electromagnet. Clutch 348 is equipped with two coils 362 and 363 and with toothed rims 356 and 357, while the gear 341 has a toothed rim 358 and the reverse gear 343 has a toothed rim 359. When the switch lever 349 closes (position F) the energy from the battery or any other desired source flows through a conductor 355 and an electric coil 362 generates magnetic force and clutch 348 is attracted to the toothed rim 358 until the rim engages with the toothed rim 356. When the lever connects the current with the coil 363 by means of conductor 354 (position R), the clutch will be locked with the reversing gear 343 by means of the teeth 357 and 359.

The teeth of the rims 356, 357, 358, 359 are tapered as shown in Figure 47, so they disengage as soon as the electric current is shut off and magnetic force disappears.

In Figures 48 and 49, I have shown a form of runner embodying my invention in which each semi-free vane 258 located at the entrance in the runner is equipped with a pinion gear 360, and all these pinions are in mesh with a common ring gear 361, so all the vanes 258 must move simultaneously. In this way any oscillation of the vanes due to local turbulence of the fluid is prevented.

In the construction shown in Figures 51 and 52 a two stage radial turbo torque converter is illustrated. The numeral 365 indicates one end of an engine crankshaft carrying a fan shape flywheel 366, driving a primary shaft 208 through a spline 367. A stationary casing 368 with a cover 369 is bolted to a flywheel housing 370. A first impeller 231 and a second impeller 232 are secured to each other by means of a sleeve 371, and bolts 372, 373. Both of the runners 244 and 245 have adjustably movable blades 374 as illustrated in Figure 52, eccentrically pivoted and secured to little shafts 375. Each of these shafts 375 has a lever 376 and weight 377, forming a centrifugal governor which is kept in position by a spring 378 anchored to a runner shroud 379 or 380, at 392.

The guide wheel of this device comprises a bladeless vortex chamber 381, a bladeless space 382 with almost uniformly diverging boundaries and with an enlarged space 383 just ahead of the entrance into the gates 255.

The stuffing box assembly 384, comprising a packing 385, yieldingly urged between a sleeve 386 and a disc 387 by a spring 388, rotates with the shaft 208 as well as the sleeve 386 and the disc 387 and consequently does not wear out.

In operation, when the secondary shaft 221 is at rest or rotates at low speed, the spring 378 holds the blades 374 in position for low speed as illustrated at position L in Figure 52. At a higher speed of the secondary shaft the centrifugal force of the weight 377 overcomes the tension of the spring 378 and the blades 374 move around their shafts gradually into position the position H of Figure 52 for high speed.

Fundamentally this device comprises a guide wheel, an impeller, and a runner having movable and adjustable blades, and means for turning the blades while in operation for adjusting the angles of entrance and discharge automatically under the control of centrifugal force.

Figures 53, 54, 55 and 56 illustrate a form of a two stage turbine torque converter in which the blades of the first impeller, the second impeller and the first runner consist of eccentrically pivoted auxiliary vanes 261, 262 and 379 rigidly secured to shafts 380, 381 and 382 and centrically pivoted main vanes 383, 384 and 385 rigidly secured to shafts 386, 387 and 388. The ends of the shafts 380, 386, 381, 387 are provided with gear segments 393 and 394. Each of the gears 394 of the auxiliary vanes mesh with corresponding gears 393 of a main vane as indicated in Figure 55. The ends of the shafts 382 and 388 are provided with levers 389 and 390 connected by a link 391.

In operation, the units of the first set of auxiliary vanes, being pivoted at their leading edges, adjust themselves to the rate and direction of the fluid flow and by means of the gear segments for the impellers or by connection links for the runner, turn the main blades and adjust their inclination.

Basically the converter of Figures 53 to 56 consists of impellers and runners having movable blades and means for turning the blades while in operation for adjusting the angles of fluid entrance and fluid discharge automatically under the control of the fluid flow.

In Figures 30 to 42 inclusive I have shown various forms of "free clutch" devices which can be used in connection with my turbine torque converter, and which can be embodied either directly in the gear box or on any other place between the rear axle of the vehicle and converter, in order to facilitate shifting between forward and reverse without the necessity of bringing the vehicle to a complete stop before shifting can be attempted.

A form of coil spring clutch shown in Figures 30 and 31 comprises a coil spring 400 and a driving member 401, to which the spring is hooked, an outside driven member 402, and an inside driven member 403. The driving torque expands the spring in reverse and contracts the spring in forward gear. The spring is slightly smaller in diameter than the bore of the outside driven member 402, and is normally slightly larger in diameter than the inside driven member 403, causing it to grip in both the driving and driven member. At every change from "reverse" to "forward" or vice versa a certain short time elapses before the grip of the coil spring changes from the outside driven member to the inside driven member, or vice versa, and in this period of time the vehicle is free wheeling and the shift of gears can be readily accomplished. The initial grip is caused by the wedging action of the loose end 456 of the spring 400 between the outer and the inner members.

Another embodiment of a free clutch which functions in a similar way is illustrated in Figures 37, 38 and 39. In this design the driving torque is transmitted from a driving member 404 to a driven member 405 through a screw 406 and a sleeve 407 which has a mating thread. The action of the threaded sleeve is such as to apply pressure to the clutch plates, that is the driving discs 408, and the driven discs 409, when the engine is delivering power to the vehicle by means of a flange 410, or when the vehicle drives the engine, through a flange 411, and the engine is used as a brake. The driving discs 408 are splined to the member 404, but can have a limited axial movement on the splines. The driven discs 409 are splined to the sleeve 407 and have only very small axial movement on their splines. A spring 412 gives an initial friction to the plates just sufficient to turn the sleeve on the screw 406 and cause axial movement of the sleeve and the plates. As soon as the driving discs hit a stop 413 or 414 their axial movement is restricted and the screw action applies pressure to the clutch plates which lock the driven member to the driving member.

Other applications of easy shifting clutches are illustrated in Figures 32 and 33 for form B; Figures 34, 35 and 36 for form C; Figures 40, 41 and 42 for form D. The same numerals when possible are used for corresponding parts in these figures as used in Figure 1 but with after-script B, C, D.

Form B (Figures 32 and 33) employs two multiple roller clutches 420 for forward and 421 for reverse drive. This clutch possesses particularly high power transmitting capacity. Inside of each of the cylindrical housings 422 integral with 118B, and 432 integral with 134B, are a pair of outer wedges 424 and inner wedges 425, and between them a plurality of rollers 426. Each clutch is capable of independent rotation in one direction only, i. e. the direction which is opposite to the driving torque either direct or reverse. When the driving torque is applied, the rollers 426 are compressed by the wedging action of the parts 424 and 425 and produce great pressure of outer wedges against the housing 423 and the inner wedges against the shaft 128B. Figure 33 shows a reverse clutch 421. It thus appears that the housing 423 can be frictionally secured to the shaft 128B in one direction.

The intitial movement of the wedges 424 and 425 is caused by a pair of wedges 427 associated with the disc 429 for direct drive or by a pair of wedges 428 associated with the disc 430 for reverse drive. The disc 430 is guided by pins 432, and revolves with the main wedges 424 in the reverse clutch 421, while the disc 429 being guided by the pins 431 rotates with the wedges in the forward clutch 420. Both discs are axially shiftable by a fork 147B. The construction of the clutch 420 is the same as that of the clutch 421, but the wedges 424 and 425 are arranged in the opposite direction.

A synchronizing mechanism to facilitate shifting is shown in Figures 34, 35, 36 (form C). This form uses a pair of friction cone clutches 434 for forward speed, and 436 for reverse speed. Inside of each of the cone clutches is a weak spring 435 and 437. Each of the cone clutches is axially slidable on the splines 438 and 439 respectively.

In operation when the whole jaw clutch assembly 144C is shifted partly forward by a fork (not shown) the cone clutch 434 comes into contact with the conical surface 440 of the gear 118C and synchronizes rotation of the shifting jaw clutch assembly with the rotation of the pinion gear 118C. Further shifting engages easily the now already synchronized jaws 145C and 142C. Synchronizing in reverse is accomplished by means of a conical surface 441 after the reverse gear 134C and by the cone 436 after which the jaws 143C and 146C are engaged.

Form D illustrated in Figures 40, 41 and 42 is similar to the form B in that it uses two multiple ball clutches, one overrunning clutch for forward drive and one overrunning clutch for reverse drive. The overrunning clutches in this design have a common shifting unit 144D splined to the third shaft 128D and serves to complete the high gear or reverse gear connection. Figure 41 is an end section of the reverse free clutch unit, which consists of a four-lobed inner cam 446, associated with the shifting unit 144D, an outer ring 448 associated with the reverse gear 134D, four springs 460 and four sets 462 of two balls each graduated in diameter to conform to the cam profile, the cam curves are a true circular arc.

The wedging angle of the balls is about 5°, and the springs push the balls into engagement. The drive can be transmitted only in the direction of the arrow (reverse). Similarly the forward clutch comprises a cam 447 associated with the unit 144D, an outer ring 449, associated with the forward gear 118D, springs 461, four sets 463 of two balls each. The ends 464 and 465 of the cams 446 and 447 are tapered to increase the clearance between balls and cams so the engagement of the balls in the forward clutch is impossible when the shifting unit is in neutral or in reverse, and vice versa. When, however, the unit 144D is shifted toward the reverse gear the clearance between the balls, cam 446, and the outer ring 448 decreases so that the ring produces a wedging action upon the balls 462, and the friction created between the balls and the outer ring causes the cam 446 to become locked to the ring.

It will be seen that my invention consists broadly in the provision of means to alter the angles of the driving, driven, and stationary vanes to make these vane angles correct at different speeds and loads. The invention further consists in the provision of means to diminish changes, due to different speeds and loads of the fluid directions when entering the driving, driven and stationary vanes, in order to maintain the efficiency of the device constantly high. Further the invention consists in the provision of automatic connecting means for locking the driving vanes to the driven vanes under the control of their speeds, and in the provision of means to produce reverse torque automatically variable with the load and speed.

The invention may also be characterized as means for transmitting power, having primary means for generating energy, secondary means for absorbing most of the energy generated, and third means for transmitting the remaining part of energy not absorbed by the secondary means at overloads back to said primary means. The primary, secondary and third means having auxiliary means to absorb part of energy at overloads, and means to lock the primary and said secondary means together automatically under the control of their speeds.

In combination with the torque converter I provide means to facilitate reversing, braking and stopping of the vehicle without the necessity of bringing the vehicle to a complete stop at the moment of reversing the fluid transmission.

Features disclosed but not claimed herein are being claimed in my co-pending applications Serial No. 132,925, filed March 25, 1937 now patent No. 2,235,370, granted March 18, 1941; Serial No. 310,786, filed December 23, 1939; Serial No. 317,637, filed February 7, 1940; Serial No. 333,360, filed May 4, 1940; and Serial No. 334,315, filed May 10, 1940.

While the invention has been described with particular reference to certain preferred embodiments, it is to be understood that the scope of the invention is not to be limited by anything appearing herein, other than the following claims.

What I claim is:

1. A fluid power transmission having a passage for fluid including an impeller having vanes, a turbine having vanes and a guide wheel having gates, said impeller and turbine vanes and said guide wheel gates comprising a circuit in which fluid circulates to transmit power, the wetted area of the gates being substantially smaller than twice the area of the surface of revolution generated by the rotation of the guide wheel around its axis, the length of the gates in direction of the flow being smaller than the spacing of the gates, and the actual discharge angle of the gates being substantially smaller than the mean effective angle of the fluid at the outlet from the gates so that the fluid discharging angle from the gates is variable according to the load transmitted.

2. A fluid power torque converter comprising a casing, a fluid in the casing, an impeller having vanes, a turbine runner having several sets of blades, and a guide wheel having gates in the casing, the units of the entrance set of blades being freely pivoted at their leading edges, stops secured to the runner to limit the inclination of the entrance blades, the entrance angle of the entrance set of blades being substantially equal to the discharge angle of the impeller vanes, said vanes, blades and gates being juxtaposed and comprising the circuit in which the fluid circulates and transmits power.

3. A rotary power transmission mechanism comprising a rotary casing for a fluid, a pump impeller energizing the fluid, series of rotary driven vanes coaxial with said impeller vanes, a shaft connected to rotate with the driven vanes, a free vortex between the impeller vanes and the driven vanes, several sets of guide vanes interposed between the exit from the driven vanes and the entrance to the impeller vanes, a stationary sleeve connected with the guide vanes, said casing and said sleeve being equipped with stuffing boxes, means to relieve fluid pressure in the stuffing boxes, and also returning fluid leakage from the stuffing box directly in the casing, the units of the last or discharging set of guide vanes with entrance diameter substantially greater than the entrance diameter of first units.

4. A rotary power transmission mechanism comprising a passage for fluid including rotary driving vanes, a wheel connected to rotate the vanes, rotary driven vanes juxtaposed to the driving vanes, a driven shaft connected to rotate with the driven vanes, a series of stationary guide vanes interposed between the exit from the driven vanes and the entrance to the driving vanes, said driven vanes being divergent with increasing curvature and thereby adapted to convert the energy of fluid velocity into pressure energy, said driving vanes having the largest possible entrance and discharge diameter, and being of the substantially axial flow and non-cell-shaped type, said driven vanes having entrance diameter substantially smaller than exit diameter of the driving vanes.

5. A fluid torque converter for transmitting power, including a casing, a fluid in the casing, primary rotary means energizing the fluid, secondary rotary means extracting energy from the fluid, third means changing the angular momentum of the fluid, and automatic means carried by one of the rotary means to effect coupling and uncoupling of the rotary means with respect to each other under the control of the other rotary means, said automatic means transmitting torque directly in forward direction at high speeds and directly from the secondary to the primary means at low speeds, a centrifugally actuated governor carried by the secondary means, said last means being disconnected at forward low speeds and at overrunning high speeds under the control of the governor.

6. A fluid torque converter for transmitting power having a casing, a circulating fluid in the casing, primary rotary means energizing the fluid, secondary rotary means extracting energy from the fluid, third means changing the angular momentum of the fluid, pawls carried by one of the rotary means, and means to bring the pawls into engagement with the other rotary means when the relative velocities of the primary and secondary means vary with respect to each other in one direction at low speeds only or at standstill under the control of centrifugal force and to release the pawls from the other rotary means when the velocities vary in the opposite direction.

7. A turbine torque converter for transmitting power including a casing, a fluid in the casing, a centrifugal pump impeller, a turbine runner in said casing, third means changing the angular momentum of the fluid, a one way clutch transmitting power from the runner to the impeller only, and a centrifugal governor to effect operation of the clutch operative at low speeds of the runner or inoperative at high speeds of the runner.

8. In a fluid power transmission, a casing, fluid in the casing, rotary coaxial juxtaposed blade wheels in the casing, a fluid channel in the blade wheels, stream adjusting zones and vortex chambers between the blade wheels, said chambers changing the pressure and velocity of the fluid, said channel having the form of a gyratory ring in which the fluid circulates, the slope of blade entrance angle of a rotary blade wheel at the exit from a vortex chamber being related to the slope of the blade angle without the vortex chamber as:

$$(m-1):(m/p-p)$$

where $m$ designates the ratio of linear velocity of the rotary wheel to the velocity of the whirl at the inlet in the vortex, and $p$ equals the ratio of the inlet radius to the exit radius of the vortex chamber.

9. In a fluid power transmission, a casing, fluid in the casing, rotary coaxial juxtaposed blade wheels in the casing, a fluid channel in the blade wheels, some of the wheels having auxiliary pivotally movable vanes, stream adjusting zones and vortex chambers between the exit from the auxiliary vanes and the inlet in the blade wheels, said channel having the form of a gyratory ring in which the fluid circulates.

10. A turbine power torque converter having a passage for fluid including an impeller, a runner and a guide wheel, said runner having auxiliary pivotally movable vanes, said impeller, runner and guide wheel being coaxial and in juxtaposed position, a vortex chamber interposed between the exit from said impeller and the inlet in said runner to increase the fluid velocity, said impeller, runner, guide wheel and vortex chamber comprising the whole circuit in the form of gyratory ring in which the fluid is circulating and transmitting power.

11. A turbine power torque converter having a passage for fluid including centrifugal pump impeller, a turbine runner, a guide wheel, means to increase fluid velocity between the impeller and runner, means to retard fluid velocity between the runner and guide wheel, means to retard fluid velocity between the guide wheel and impeller, said impeller, runner, and guide wheel being coaxial and juxtaposed and including automatic connecting means for locking the impeller to the runner or release it therefrom under the control of the speed of the runner.

12. In a turbine power transmission a casing, fluid in the casing, vortex chambers, blade wheels in the casing, a fluid channel in the wheels, a one-way clutch and a centrifugal clutch between the wheels, said wheels being coaxial and juxtaposed and having curved passages formed therein in which power transmitting fluid is circulating, the passage in one wheel having its discharge opposite to the inlet of the passage in the other wheel, said discharge having substantially different diameter than the diameter of the inlet, said vortex interposed between the discharge and the inlet, whereby power transmitting fluid may be delivered from one of the wheels across the vortex to another of said wheels.

13. A turbine power torque converter having a passage for fluid including a pump impeller, a turbine runner and a guide wheel having vanes, a one way clutch and a centrifugal clutch between the impeller and the runner, said impeller and runner and said wheel being formed with curved passages and being coaxial and juxtaposed, said passages comprising the whole circuit in which the fluid is circulating and transmitting power, the total length of said guide vanes being shorter than their spacing.

14. In combination a vehicle having a hydraulic power transmission comprising a casing, fluid and blade wheels having vanes in the said casing, means to facilitate reversing of the rotation of one of the blade wheels so as to cause the fluid transmission to act as a brake for the vehicle, the blade wheels having curved passages with vanes and being coaxial and juxtaposed, said passages comprising the whole circuit in which the fluid is circulating and transmitting power, said blade wheels having a series of sets of blades, the units of the first set being freely pivoted at their leading edges, but equipped with stops carried by the wheels to limit the angle of their inclination, the discharge vane angle of one of the wheels being substantially equal to the entrance vane angle of the first set of said wheels.

15. A turbine power transmitter comprising a casing, fluid in the casing, a passage for circulating the fluid in the casing including rotary, coaxial and juxtaposed driving and driven blade wheels, connecting means to effect coupling or uncoupling of the blade wheels and a centrifugal governor to control the connecting means so as to transmit power from one of the blade wheels directly to the other of the blade wheels in one direction only at a predetermined speed of the last mentioned wheel and to transmit power directly from the last mentioned wheel to the first mentioned wheel in the reverse direction only at another and different predetermined speed of the last mentioned wheel.

16. In a motor vehicle, the combination with an engine flywheel and the engine housing of the vehicle, a fluid power transmission comprising a rotary casing, fluid in the casing, driving vanes, driven blades, and gates in the casing, said driving vanes connected to the casing, a driven shaft connected to the driven blades, a sleeve fastened to the engine housing and carrying the gates, a bearing on the sleeve supporting the casing at rear end, a pilot centering the casing at the rear of the flywheel, a double thrust bearing in the casing supporting the driven shaft at the front end and a double thrust bearing supporting the driven shaft in the sleeve, means connecting the casing to the rim of the flywheel to permit relative longitudinal movement and slight eccentricity but to prevent relative rotary movement.

17. A fluid torque converter comprising a passage for fluid including driving vanes energizing the fluid, driven vanes coaxial and juxtaposed to the driving vanes absorbing energy from the fluid, guide vanes increasing the angular momentum of the fluid, the guide vanes being of substantially non-cell-shaped form and having a vane length smaller than the vane spacing, said driven vanes being substantially of cell-shaped form and having a vane length greater than the vane spacing, the wetted area i. e. actual surface of the guide vanes being substantially smaller than the wetted area of the driven vanes, the discharge angle of the driven vanes being about 90 degrees, said vanes comprising the whole circuit in the form of gyratory ring in which the fluid is circulating and transmitting power.

18. In a fluid power transmission a casing, a fluid in the casing, driving and driven rotary blade wheels in the casing, automatic centrifugally operated means carried by one of the rotary wheels to effect coupling and uncoupling of the rotary wheels with respect to each other under the control of the other rotary wheel, said automatic means transmitting power directly in forward direction from the driving blade wheel to the driven blade wheel at high speeds of the driven wheel and directly in reverse direction from the driven blade wheel to the driving blade wheel at low speeds of the driven wheel and being rendered inoperative at forward low speeds and at overrunning high speeds of the driven wheel under the control of the automatic means.

19. In a fluid device for transmitting power, a casing, fluid in the casing, a driving blade wheel, a driven blade wheel juxtaposed with reference to the driving wheel, a guide wheel, a bladeless channel positioned between the discharge end of the driving blade wheel and the inlet end of the driven blade wheel, said driven wheel having an inlet diameter substantially smaller than the discharge diameter of the driving wheel, a plurality of sets of blades on one of said wheels, said wheels and channel positioned to form the circuit in which the fluid circulates and transmits power.

20. A fluid power transmission comprising a casing, fluid in the casing, an impeller, a guide wheel, a turbine having several sets of blades, the entrance set of said blades being eccentrically pivoted, stop means secured to the turbine to limit the inclination of the entrance blades, said entrance blades at least in one position being located in such a way that together with the following set of blades they form one streamline but interrupted blade system, there being a bladeless zone between the entrance blades and the following set.

21. A fluid power transmission comprising a casing, a fluid in the casing, an impeller, a turbine and a guide wheel having main and auxiliary vanes, the auxiliary vanes being slidable axially automatically under the influence of the fluid while in operation, the impeller, the turbine and the guide wheel being juxtaposed and comprising the circuit in which the fluid circulates and transmits power.

22. A fluid power transmission comprising a passage for fluid including substantially non-cell-shaped driving vanes, driven vanes juxtaposed with respect to the driving vanes and provided with a series of guide vanes, the driven vanes being divergent with increasing curvature, the entrance diameter of the driven vanes being substantially smaller than the exit diameter of the driving vanes.

23. In a fluid power transmission a casing, fluid in the casing, rotary coaxial blade wheels and a guiding blade wheel in the casing, a fluid channel in the blade wheels, at least one of said wheels comprising main and auxiliary vanes, the auxiliary vanes being slidable axially automatically under the influence of the fluid, said channel having the form of a gyratory ring in which the fluid circulates and transmits power.

24. A fluid device according to the claim 19 wherein the guide wheel is interposed between the exit from the driven blade wheel and the inlet to the driving wheel.

JOSEPH JANDASEK.